United States Patent
Child et al.

(10) Patent No.: US 10,433,122 B1
(45) Date of Patent: Oct. 1, 2019

(54) EVENT TRIGGERED MESSAGING

(71) Applicant: Vivint, Inc., Provo, UT (US)

(72) Inventors: Michael D. Child, Draper, UT (US);
Matthew Mahar, South Jordan, UT (US); Michelle Zundel, Draper, UT (US)

(73) Assignee: Vivint, Inc., Provo, UT (US)

( * ) Notice: Subject to any disclaimer, the term of this patent is extended or adjusted under 35 U.S.C. 154(b) by 0 days.

(21) Appl. No.: 16/036,787

(22) Filed: Jul. 16, 2018

Related U.S. Application Data

(63) Continuation of application No. 15/271,375, filed on Sep. 21, 2016, now Pat. No. 10,028,112, which is a continuation-in-part of application No. 15/047,437, filed on Feb. 18, 2016, now Pat. No. 9,872,155.

(51) Int. Cl.
*H04L 12/52* (2006.01)
*H04M 1/725* (2006.01)
*H04W 4/12* (2009.01)
*H04W 4/16* (2009.01)

(52) U.S. Cl.
CPC ............... *H04W 4/12* (2013.01); *H04W 4/16* (2013.01)

(58) Field of Classification Search
CPC ......... H04W 4/12; H04W 4/16; H04W 12/06; H04W 12/12; H04W 2/08; H04W 88/02; H04L 63/08; H04L 12/5895; H04L 29/08108; H04L 12/587; H04M 3/533; H04M 1/72547; H04M 3/537; H04M 2207/18; H04M 1/7255
See application file for complete search history.

(56) References Cited

U.S. PATENT DOCUMENTS

| | | | |
|---|---|---|---|
| 6,249,808 B1 | 6/2001 | Seshadri | |
| 7,243,123 B1 | 7/2007 | Allen et al. | |
| 8,489,075 B2 | 7/2013 | Shaw | |
| 8,897,433 B2 | 11/2014 | Mota et al. | |
| 2002/0125993 A1* | 9/2002 | Gutta | G06Q 10/107 340/5.52 |
| 2004/0162059 A1 | 8/2004 | Hiltunen et al. | |
| 2004/0229569 A1 | 11/2004 | Franz | |

(Continued)

FOREIGN PATENT DOCUMENTS

WO 2014137241 A1 9/2014

OTHER PUBLICATIONS

Park, et al., "Robot Based Videophone Service System for Young Children", 2009 IEEE Workshop on Advanced Robotics and its Social Impacts, Tokyo, Japan, Nov. 23, 2009.

*Primary Examiner* — Moustapha Diaby
(74) *Attorney, Agent, or Firm* — Holland & Hart LLP

(57) ABSTRACT

Apparatuses, techniques, and methods for a security and/or automation system are described. In some cases, these may include a first user recording a message and the message being broadcast or conveyed to a second user based on the second user's identity and/or location and/or a relevant time of recording or broadcasting, among other things. The methods may include receiving a first communication from a first user, storing the first communication in memory, identifying a second user at a first location, retrieving the first communication from memory, the retrieving based at least in part on the identification of the second user, and conveying the first communication to the second user at the first location.

20 Claims, 11 Drawing Sheets

(56) References Cited

U.S. PATENT DOCUMENTS

| | | |
|---|---|---|
| 2005/0283813 A1 | 12/2005 | Jamail et al. |
| 2006/0056601 A1 | 3/2006 | Herron et al. |
| 2006/0068700 A1 | 3/2006 | Habaguchi et al. |
| 2008/0004002 A1 | 1/2008 | Chin et al. |
| 2008/0072317 A1 | 3/2008 | Lee et al. |
| 2008/0122934 A1 | 5/2008 | Marotti |
| 2009/0153660 A1 | 6/2009 | Liu |
| 2009/0291669 A1 | 11/2009 | Choi et al. |
| 2010/0049702 A1 | 2/2010 | Martinez et al. |
| 2010/0141778 A1* | 6/2010 | Basson ............... H04N 5/232 348/207.1 |
| 2010/0304766 A1 | 12/2010 | Goyal |
| 2010/0311347 A1* | 12/2010 | Le Thierry D'Ennequin ............. H04N 1/32106 455/67.11 |
| 2011/0285806 A1 | 11/2011 | Shirai |
| 2012/0092444 A1 | 4/2012 | Mackie et al. |
| 2012/0166568 A1 | 6/2012 | Helbling et al. |
| 2012/0182382 A1 | 7/2012 | Serramalera |
| 2012/0245941 A1 | 9/2012 | Cheyer |
| 2013/0095865 A1 | 4/2013 | Roets |
| 2013/0165166 A1 | 6/2013 | Appelman |
| 2014/0266681 A1 | 9/2014 | Dunn et al. |
| 2015/0035934 A1 | 2/2015 | Chen et al. |
| 2015/0222844 A1* | 8/2015 | Turbin ................ H04N 5/91 386/239 |
| 2015/0334285 A1* | 11/2015 | Zhang ............. H04N 5/23222 348/211.2 |

* cited by examiner

EVENT TRIGGERED MESSAGING

CROSS-REFERENCE TO RELATED APPLICATIONS

The present application is a continuation of U.S. patent application Ser. No. 15/271,375, titled: "Event Triggered Messaging," filed Sep. 21, 2016, which is a continuation-in-part of U.S. patent application Ser. No. 15/047,437, titled: "Event Triggered Messaging," filed on Feb. 18, 2016, the disclosures of which are incorporated herein in their entirety by this reference.

BACKGROUND

The present disclosure relates to security and/or automation systems, and more particularly to event triggered audio and/or video messaging recording and broadcast.

Security and automation systems are widely deployed to provide various types of communication and functional features such as monitoring, communication, notification, and/or others. These systems may be capable of supporting communication with at least one user through a communication connection or a system management action.

In current environments, audio messages may be recorded on a cellular phone and broadcast for an intended user on the intended user's cellular phone; however, in some cases a person may wish to leave a message (audio and/or video) for a remotely located intended recipient or a group of recipients, but may not have the ability to do so. In addition, current systems broadcast messages only based on a manual input. In other cases, parents may not be continuously aware of their child's activities within the home and may be limited in methods of establishing communication with them. Some ways of communicating may be less effective and require additional time or resources. The following description provides alternative novel systems and methods for recording and broadcasting audio and/or video messages.

SUMMARY

In some embodiments, users may record audio and/or video messages directly onto a system or transmitted recorded messages to a system to be stored and/or broadcast to other users in other locations and at other times. In some embodiments, the messages may be broadcast based on detecting the presence of a person and/or identifying a person. For example, by determining a person's identity in a home, a message directed to the person or a group that include the person may be broadcast or otherwise delivered. In other scenarios, message delivery may be performed (or not) based on characteristics of the message, the intended audience, other users accompanying the intended person, and/or other factors. The detecting and identification may be based on movement, personal identification, location, time, and other situations and events.

A method for automation and/or security is described. The method may include receiving a first communication from a first user, storing the first communication in memory, identifying a second user at a first location, retrieving the first communication from memory, the retrieving based at least in part on the identification of the second user, and conveying the first communication to the second user at the first location.

An apparatus for automation and/or security is described. The apparatus may include a processor, memory in electronic communication with the processor, and instructions stored in the memory. The instructions may cause the processor to receive a first communication from a first user, store the first communication in memory, identify a second user at a first location, retrieve the first communication from memory, the retrieving based at least in part on the identification of the second user, and convey the first communication to the second user at the first location.

A non-transitory computer readable medium for automation and/or security is described. The non-transitory computer readable medium may store a program that, when executed by a processor, causes the processor to receive a first communication from a first user, storing the first communication in memory, identify a second user at a first location, retrieve the first communication from memory, the retrieving based at least in part on the identification of the second user, and convey the first communication to the second user at the first location.

In some embodiments of the method, apparatus, and/or non-transitory computer-readable medium described above, the conveying may include broadcasting the first communication to the second user and/or transmitted the first communication to the second user.

Some embodiments of the method, apparatus, and/or non-transitory computer-readable medium may further include processes, features, means, and/or instructions for: determining whether the second user received the first communication, and conveying the first communication to the second user at a second location based at least in part on whether the second user received the first communication.

Some embodiments of the method, apparatus, and/or non-transitory computer-readable medium may further include processes, features, means, and/or instructions for determining if the second user is one of a group of intended recipients, the group of intended recipients comprising the second user and a third user, and conveying the first communication to the second user based at least in part on determining if the second user is one of the group of intended recipients.

In some embodiments of the method, apparatus, and/or non-transitory computer-readable medium described above, identifying the second user may include receiving biometric information associated with the second user from at least one sensor; and analyzing the received biometric information.

In some embodiments of the method, apparatus, and/or non-transitory computer-readable medium described above, receiving biometric information may include receiving at least one of facial recognition data, or retinal data, or fingerprint data, or voice data, or electronic device data associated with the second user, or radio frequency data, or personal identification data associated with the second user, or a combination thereof.

Some embodiments of the method, apparatus, and/or non-transitory computer-readable medium may further include processes, features, means, and/or instructions for: receiving an audio identifier input by the first user, and identifying the second user at the first location based at least in part on the received audio identifier.

In some embodiments of the method, apparatus, and/or non-transitory computer-readable medium described above, conveying the first communication may be further based at least in part on determining if the second user is located at the first location during a predetermined time period; and conveying the first communication during the predetermined time period based at least in part on determining if the second user is located at the first location during the predetermined time period.

Some embodiments of the method, apparatus, and/or non-transitory computer-readable medium may further include processes, features, means, and/or instructions for: receiving an alphanumeric identifier input by the first user; and identifying the second user at the first location based at least in part on the received alphanumeric identifier.

Some embodiments of the method, apparatus, and/or non-transitory computer-readable medium may further include processes, features, means, and/or instructions for: receiving a second communication at the first location; and transmitting the second communication to a remote device.

In some embodiments of the method, apparatus, and/or non-transitory computer-readable medium described above, transmitting the second communication to the remote device may be based at least in part on identifying a fourth user associated with the remote device. In some embodiments, identifying the fourth user may include determining the first user and the fourth user are synonymous.

A method of wireless communication is described. The method may include receiving a request at a camera, recording a message based at least in part on the request, identifying a recipient for the message based at least in part on the recorded message, or the request, or a combination thereof, and transmitting the message to a device associated with the identified recipient.

An apparatus for wireless communication is described. The apparatus may include a processor, memory in electronic communication with the processor, and instructions stored in the memory. The instructions may be operable to cause the processor to receive a request at a camera, record a message based at least in part on the request, identify a recipient for the message based at least in part on the recorded message, or the request, or a combination thereof, and transmit the message to a device associated with the identified recipient.

A non-transitory computer readable medium for wireless communication is described. The non-transitory computer-readable medium may include instructions operable to cause a processor to receive a request at a camera, record a message based at least in part on the request, identify a recipient for the message based at least in part on the recorded message, or the request, or a combination thereof, and transmit the message to a device associated with the identified recipient.

Some embodiments of the method, apparatus, or non-transitory computer-readable medium described above may further include processes, features, means, or instructions for determining whether the recipient may be located at a predetermined location during a predetermined period, wherein the message may be transmitted during the predetermined period based at least in part on the determining whether the recipient may be located at the predetermined location during the predetermined period.

Some embodiments of the method, apparatus, or non-transitory computer-readable medium described above may further include processes, features, means, or instructions for receiving a pre-recorded message for an intended recipient from a remote device. Some embodiments of the method, apparatus, or non-transitory computer-readable medium described above may further include processes, features, means, or instructions for identifying the intended recipient based at least in part on the received message. Some embodiments of the method, apparatus, or non-transitory computer-readable medium described above may further include processes, features, means, or instructions for broadcasting a portion of the pre-recorded message based at least in part on the identification.

Some embodiments of the method, apparatus, or non-transitory computer-readable medium described above may further include processes, features, means, or instructions for receiving location information associated with the intended recipient relative to the camera, wherein broadcasting the portion of the pre-recorded message may be based at least in part on the received location information.

Some embodiments of the method, apparatus, or non-transitory computer-readable medium described above may further include processes, features, means, or instructions for broadcasting an audio component of the pre-recorded message based at least in part on determining that the intended recipient may be within a predetermined distance from the camera. Some embodiments of the method, apparatus, or non-transitory computer-readable medium described above may further include processes, features, means, or instructions for transmitting a video component of the pre-recorded message to a device associated with the camera.

In some embodiments of the method, apparatus, or non-transitory computer-readable medium described above, the intended recipient may be identified based at least in part on any of an alphanumeric identifier input, or an audio identifier, or a visual identifier, or a combination thereof.

Some embodiments of the method, apparatus, or non-transitory computer-readable medium described above may further include processes, features, means, or instructions for identifying a predicted location associated with the identified recipient based at least in part on a schedule associated with the identified recipient, wherein the message may be transmitted based at least in part on the predicted location associated with the identified recipient.

In some embodiments of the method, apparatus, or non-transitory computer-readable medium described above, the schedule may be based at least in part on data captured by the camera. In some embodiments of the method, apparatus, or non-transitory computer-readable medium described above, the schedule may be based at least in part on data captured within a structure associated with the camera. In some embodiments of the method, apparatus, or non-transitory computer-readable medium described above, transmitting the message to the device associated with the identified recipient comprises: broadcasting the message to one or more messaging interfaces associated with the device.

In some embodiments of the method, apparatus, or non-transitory computer-readable medium described above, the message comprises any of an audio message, or a video message, or a combination thereof. In some embodiments of the method, apparatus, or non-transitory computer-readable medium described above, the request comprises any of a received tactile input, or a verbal command, or a gestural command, or a combination thereof. In some embodiments of the method, apparatus, or non-transitory computer-readable medium described above, the message may be transmitted independent of user input on the device.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

Figure 1:
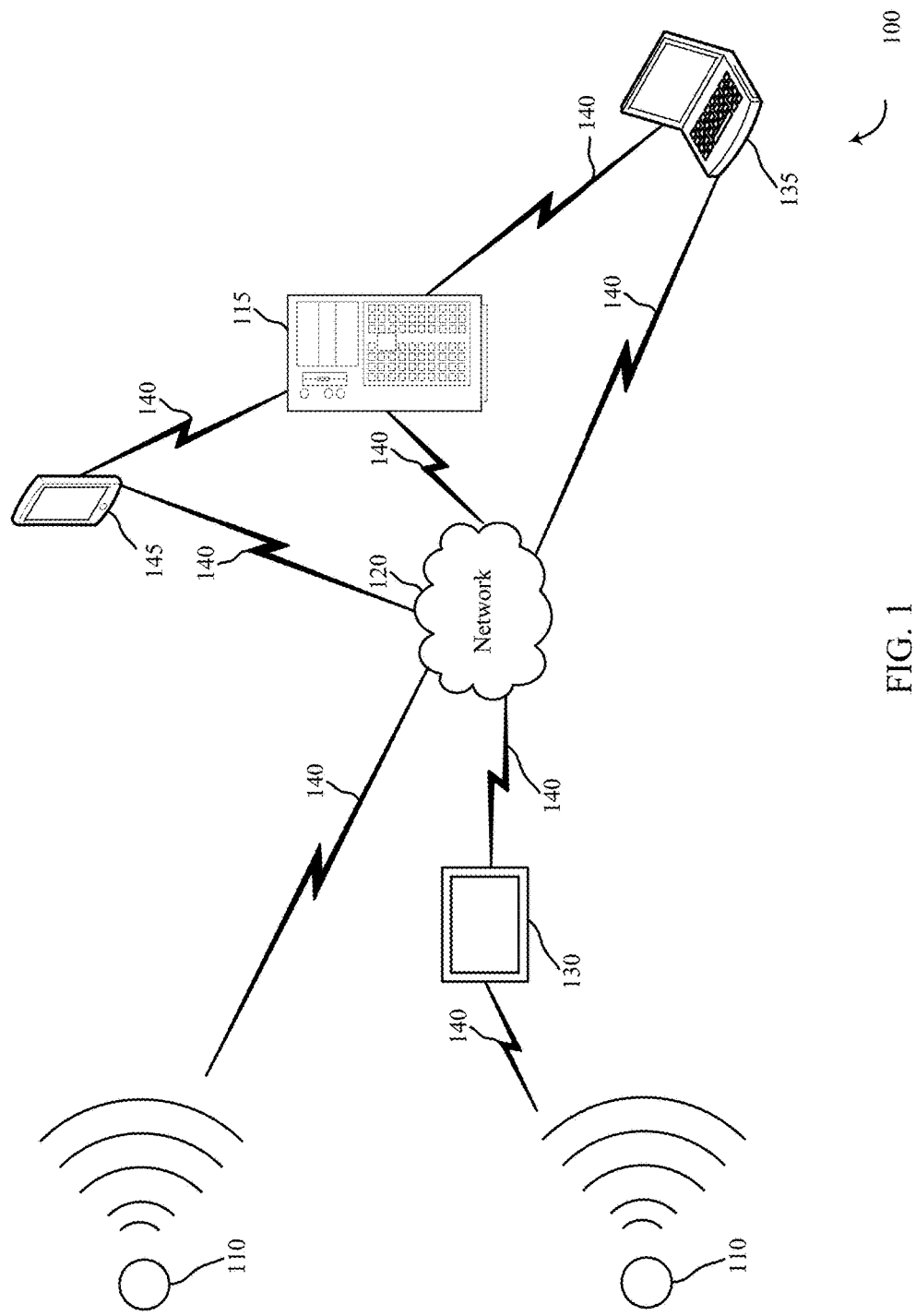
FIG. 1 shows a block diagram relating to a security and/or an automation system, in accordance with various aspects of this disclosure.

The systems and methods described herein relate generally event triggered messaging. In some embodiments, users may record audio and/or video messages directly onto a system or transmitted recorded messages to a system to be stored and/or broadcast to other users in other locations and at other times. In some embodiments, the messages may be broadcast based on detecting the presence of a person and/or identifying a person. The detecting and identification may be based on movement, personal identification, location, time, and other situations and events, among other things.

In some embodiments, a device (e.g., a two-way communication camera) may receive at least one instruction from a person requesting to establish a connection with a second person to leave a message for the second person. This communication may be initiated by the camera to another device or may be initiated by another device (e.g., smartphone, personal computer) to the camera. In some embodiments, the communication may be based on a signal initiated by the camera or a Wi-Fi initiated call that is configured to establish communication with a cellular phone or another device. In instances where a second person may not be able to be reached, the two-way communication camera may provide a messaging feature allowing the first person to send an audio and/or a video message. In some embodiments, the two-way communication camera may be enabled to receive, store, and/or broadcast messages from the first person, where the messages may be intended to be broadcast to the second person from the same device or to a different device at a later time.

In some embodiments, a person may want to leave a quick video/voice message to other people within the home without requiring the live interaction. For instance, a parent may record an audio message using the two-way communication camera that may be broadcast to a child. In further embodiments, the two-way communication camera may be enabled to broadcast messages to a remote device at a different location outside the home. For example, a child may want to record a message but knows a parent is unavailable (e.g., based on a work schedule or another obligation) or may be unable to reach a parent using a video call. A child may then be able to record a message that is transmitted to the parent's cell phone, computer, or email using the in-house camera. In one example, the camera may be located in at least one room of the house, for example, the kitchen. In this example, a son located in the house may wish to communicate with a family member located away from the house, but may not be able to communicate by way of a phone call. Thus, the son may interact with the two-way communication camera to leave an audio/visual message for the mother, which may be captured by one or more components of the two-way communication camera and communicated from the two-way communication camera.

The following description provides examples and is not limiting of the scope, applicability, and/or examples set forth in the claims. For example, embodiments may be directed to the home environment, but the disclosure is not limited solely to such a location and may be implemented in any environment including an office building, a school, a commercial location etc. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

FIG. 1 is an example of a communications system 100 in accordance with various aspects of the disclosure. The communications system 100 may include one or more sensors 110, network 120, server 115, control panel 130, remote computing device 135, and/or local computing device 145. The network 120 may provide user authentication, encryption, access authorization, tracking, Internet Protocol (IP) connectivity, and other access, calculation, modification, and/or functions. The control panel 130 may interface with the network 120 through a first set of wired and/or wireless communication links 140 to communicate with one or more remote servers 115. The control panel 130 may perform communication configuration, adjustment, and/or scheduling for communication with the computing devices 135 and 145, or may operate under the control of a controller. Control panel 130 may communicate with a back end server (such as the remote server 115)—directly and/or indirectly—using the first set of one or more communication links 140.

The control panel 130 may wirelessly communicate with the remote computing device 135 and the local computing device 145 by way of one or more antennas. The control panel 130 may provide communication coverage for a respective geographic coverage area. In some examples, control panel 130 may be referred to as a control device, a base transceiver station, a radio base station, an access point, a radio transceiver, or some other suitable terminology. The geographic coverage area for a control panel 130 may be divided into sectors making up only a portion of the coverage area. The communications system 100 may include control panels 130 of different types. There may be overlapping geographic coverage areas for one or more different parameters, including different technologies, features, subscriber preferences, hardware, software, technology, and/or methods. For example, each control panel 130 may be related to one or more discrete structures (e.g., a home, a business) and each of the one more discrete structures may be related to one or more discrete areas. In other examples, multiple control panel 130 may be related to the same one or more discrete structures (e.g., multiple control panels relating to a home and/or a business complex).

The computing devices 135 and 145 may be dispersed throughout the communications system 100 and each computing device 135 and 145 may be stationary and/or mobile. Computing devices 135 and 145 may include a cellular phone (e.g., a smart phone), a personal digital assistant (PDA), a wireless modem, a wireless communication device, a wearable electronic device (e.g., a smart watch), a handheld device, a tablet computer, a laptop computer, a cordless phone, a wireless local loop (WLL) station, a display device (e.g., TVs, computer monitors, etc.), a printer, a camera, and/or the like, among other things. Computing devices 135 and 145 may also include or be referred to by those skilled in the art as a user device, a smartphone, a BLUETOOTH® device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology. The geographic coverage area for the control panel 130 may be divided into sectors making up only a portion of the coverage area.

The communication system, therefore, may comprise more than one control panel 130, where each control panel 130 may provide geographic coverage for one or more sectors of the coverage area. The communications system 100 may include one or more control panels 130 of different types. The control panel 130 may be related to one or more discrete areas. Control panel 130 may be a home automation system control panel or a security control panel, for example, an interactive panel located in a user's home. Control panel 130 may be in direct communication by way of wired and/or wireless communication links with the one or more sensors 110. In some embodiments, control panel 130 may receive sensor data from the one or more sensors 110 directly and/or indirectly by way of computing devices 135 and 145, server 115, and wireless communication links 140, among other things.

In one embodiment, the control panel 130 may comprise, but is not limited to, a speaker, a microphone, and/or a camera (e.g., enabled for still image capture and/or video capture and/or audio capture). In some embodiments, the camera (e.g., two-way communication camera) may capture thermal imaging. The control panel 130 may operate to receive, process, broadcast audio and/or video communications received from computing devices 135 and/or 145. In other embodiments, control panel 130 may receive input in the form of audio data, video data, biometric data, geographic data (e.g. geo-tagging, global positioning data), some combination, and/or the like. In other embodiments, the control panel 130 itself may operate to broadcast audio and/or video.

The control panel 130 may wirelessly communicate with the sensors 110 via one or more antennas. The sensors 110 may be dispersed throughout the communications system 100 and each sensor 110 may be stationary and/or mobile. A sensor 110 may include and/or be one or more sensors that sense: proximity, motion, temperatures, humidity, sound level, smoke, structural features (e.g., glass breaking, window position, door position), time, amount of light, geo-location data of a user and/or a device, distance, biometrics, weight, speed, height, size, heat signatures, preferences, weather, system performance data, vibration, respiration, heartbeat, and/or other inputs that relate to a security and/or an automation system. Computing devices 135 and 145 and/or a sensor 110 may be able to communicate through one or more wired and/or wireless connections with various components such as control panels, cameras, base stations, and/or network equipment (e.g., servers, wireless communication points, etc.) and/or the like.

The communication links 140 shown in communications system 100 may include uplink (UL) transmissions from computing devices 135 and/or 145 and/or sensors 110 to a control panel 130, and/or downlink (DL) transmissions, from a control panel 130 to computing devices 135 and/or 145. In some embodiments, the downlink transmissions may also be called forward link transmissions, while the uplink transmissions may also be called reverse link transmissions. Each communication link 140 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels, etc.), overhead information, user data, etc. The communication links 140 may transmit bidirectional communications and/or unidirectional communications. Communication links 140 may include one or more connections, including but not limited to, 345 MHz, Wi-Fi, BLUETOOTH®, BLUETOOTH® Low Energy, cellular, Z-WAVE®, 802.11, peer-to-peer, LAN, WLAN, Ethernet, fire wire, fiber optic, and/or other connection types related to security and/or automation systems.

In some embodiments, control panel 130 and/or computing devices 135 and 145 may include one or more antennas for employing antenna diversity schemes to improve communication quality and reliability between control panel 130 and computing devices 135 and 145. Additionally or alternatively, control panel 130 and/or computing devices 135 and 145 may employ multiple-input, multiple-output (MIMO) techniques that may take advantage of multi-path, mesh-type environments to transmit multiple spatial layers carrying the same or different coded data.

While the computing devices 135 and/or 145 may communicate with each other through the control panel 130 using communication links 140, each computing device 135 and/or 145 may also communicate directly and/or indirectly with one or more other devices via one or more direct communication links 140. Two or more computing devices 135 and 145 may communicate via a direct communication link 140 when both computing devices 135 and 145 are in the geographic coverage area or when one or neither of the computing devices 135 or 145 is within the geographic coverage area. Examples of direct communication links 140 may include Wi-Fi Direct, BLUETOOTH®, wired, and/or, and other P2P group connections. The computing devices 135 and 145 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within communications system 100.

In one example embodiment, the computing devices 135 and 145 may be a remote computing device and a local computing device, respectively. Local computing device 145 may be a custom computing entity configured to interact with sensors 110 via network 120, and in some embodiments, via server 115. In other embodiments, remote computing device 135 and local computing device 145 may be general purpose computing entities such as a personal computing device, for example, a stand-alone two-way communication camera, a desktop computer, a laptop computer, a netbook, a tablet personal computer (PC), a control panel, an indicator panel, a multi-site dashboard, an iPod®, an iPad®, a smart phone, a mobile phone, a personal digital assistant (PDA), and/or any other suitable device operable to send and receive signals, store and retrieve data, and/or execute modules.

Control panel 130 may be a smart home system panel, for example, an interactive panel mounted on a wall in a user's home. In some embodiments, all or part of the control panel may be detached and thus be used as a portable device. In other embodiments, the control panel may be coupled to other fixtures in the home (e.g., or other location), such as a countertop, table, appliance (e.g., refrigerator). Control panel 130 may be in direct and/or indirect communication via wired or wireless communication links 140 with the one or more sensors 110, or may receive sensor data from the one or more sensors 110 via local computing device 145 and network 120, or may receive data via remote computing device 135, server 115, and network 120. In some embodiments, the control panel 130 may include or be in communication with a two-way communication camera.

The computing devices 135 and 145 may include memory, a processor, an output, a data input and a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some embodiments, the computing devices 135, 145 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving and displaying data from sensors 110.

The processor of the local computing device 145 may be operable to control operation of the output of the local computing device 145. The output may be a television, a plasma device, a liquid crystal display (LCD) monitor, a cathode ray tube (CRT) monitor, speaker, tactile output device, and/or the like. In some embodiments, the output may be an integral component of the local computing device 145. Similarly stated, the output may be directly coupled to the processor. For example, the output may be the integral display of a tablet and/or smart phone. In some embodiments, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing device 145 to the output.

The remote computing device 135 may be a computing entity operable to enable a remote user to monitor the output of the sensors 110. In some embodiments, the remote computing device 135 may be functionally and/or structurally similar to the local computing device 145 and may be operable to receive data files from and/or send signals to at least one of the sensors 110 or the control panel 130 via the network 120. The network 120 may be the Internet, an intranet, a personal area network, a local area network (LAN), a wide area network (WAN), a virtual network, a telecommunications network implemented as a wired network and/or wireless network, etc. The remote computing device 135 may receive and/or send signals over the network 120 via communication links 140 and server 115.

In some embodiments, one or more sensors 110 may communicate through wired and/or wireless communication links 140 with one or more of the computing devices 135 and 145, the control panel 130, and/or the network 120. The network 120 may communicate through wired and/or wireless communication links 140 with the control panel 130, and/or the computing devices 135 and 145 through server 115. In some embodiments, the network 120 may be integrated with any of the computing devices 135, 145 and/or server 115 such that separate components are not required. Additionally, in some embodiments, one or more sensors 110 may be integrated with control panel 130, and/or control panel 130 may be integrated with local computing device 145 such that separate components are not required.

In some embodiments, the one or more sensors 110 may be sensors configured to conduct periodic and/or ongoing automatic measurements related to determining the identity of a person and/or determining the location of a person within a predetermined area. In other embodiments, the sensors may be configured to determine presence, identity, and location based on a user request. Each sensor 110 may be capable of sensing multiple identification and/or location determining parameters, or alternatively, separate sensors 110 may monitor separate identification and/or location determining parameters. For example, one sensor 110 may determine the identity of a person, while another sensor 110 (or, in some embodiments, the same sensor 110) may detect the presence of and/or location of the person. As another example, multiple sensors 110 may facilitate determining the identity of a person, while another sensor 110 (or, in some embodiments, one of the multiple sensors 110) may detect the presence of and/or location of the person.

Sensors 110 may determine data related to the presence, location, and/or identification of a person based on determining motion, sound (e.g., voice), visually by way of anatomical recognition (e.g. facial scan, gait recognition, tattoo matching, hair length and color, etc.). In addition, the sensors 110 may determine data related to a radio frequency identification (RFID) element associated with the person, an electronic signal received from an electronic device (e.g., smart phone, smart watch) associated with the person, and/or an electronic device embedded in or otherwise attached to a person (e.g., sub-dermal electronics, collar, watch).

In some embodiments, a local computing device 145 may additionally monitor alternate identification and/or location-determination parameters, such as using heartbeat, respiration, thermal, biometric and/or audio sensors. In alternate embodiments, a user may input identification and location data directly at the local computing device 145 or control panel 130. For example, a person may enter identification data into a dedicated application on his smart phone or smart watch indicating that he is located in the living room of his house. The identification and location data may be communicated to the remote computing device 135 accordingly. In addition, a location feature (e.g., GPS) integrated with the dedicated application on the person's portable electronic device may communicate the person's location to the remote computing device 135. In other embodiments, electronic boundaries may be established (e.g., geo-fences) delineating specific areas within a location, and the remote computing device may indicate when a person associated with the device has crossed into our out of a geo-fenced boundary.

In some embodiments, a person may be identified (e.g., presence and/or personal identification) by way of the system recognizing the person herself based on detected physical characteristics and/or actions, and/or a portable electronic device associated with the person without the need for manual input. For example, the system may detect the presence of a portable electronic device by way of short-range communications (e.g., Near-field, BLUETOOTH®, infrared), detecting an identification number, code, or other element associated with the device or an associated network such as an International Mobile Station Equipment Identity (IMEI) number or a media access control (MAC address). In some embodiments, data associated with the device may be associated with a specific user and stored in a log or look-up table.

Data gathered by the one or more sensors 110 may be communicated to one or more computing devices 135 and/or 145, which may be, in some embodiments, a thermostat or other wall-mounted input/output smart home display. In some embodiments, the computing devices 135 and/or 145 may be, including, or be in communication with a two-way communication camera. In other embodiments, computing devices 135 and/or 145 may be a personal computer or smart phone. Where computing devices 135 and/or 145 is/are a smart phone, the smart phone may have a dedicated application directed to collecting identity and/or location data, among other things, and performing one or more operations based at least in part on the collected data. The computing device 135 and/or 145 may process the data received from the one or more sensors 110 in accordance with various aspects of the disclosure. In alternative embodiments, computing device 135 and/or 145 may process the data received from the one or more sensors 110, via network 125 and server 115 in accordance with various aspects of the disclosure. Data transmission may occur via, for example, frequencies appropriate for a personal area network (such as BLUETOOTH® or IR communications) or local or wide area network frequencies such as radio frequencies specified by the IEEE 802.15.4 standard. In other embodiments, the data gathered by the one or more sensors 110 may be communicated to the control panel 130, where a person may interact with control panel 130 to provide and/or receive information to and from the sensors.

In some embodiments, the one or more sensors 110 may be separate from the control panel 130 and may be positioned at various locations throughout the house or the property. In other embodiments, the one or more sensors 110 may be integrated or collocated with other house and/or building automation system components, home appliances, and/or other building fixtures. For example, a sensor 110 may be integrated with a doorbell or door intercom system, or may be integrated with a front entrance light fixture. In other embodiments, a sensor 110 may be integrated with a wall outlet and/or switch. In other embodiments, the one or more sensors 110 may be integrated and/or collocated with the control panel 130 itself. In any embodiment, each of the one or more sensors 110, control panel 130, and/or local computing device 145 may comprise a speaker unit, a microphone unit, and/or a camera unit (e.g., two-way communication camera), among other things.

In one embodiment, audio and/or video may be broadcast from the remote computing device 135 to the local computing device 145 and/or the control panel 130. The broadcast (whether it be audio and/or video) may be communicated directly to the local computing device 145 or the control panel 130 by way of network 120. In some embodiments, the broadcasts may be communicated first through server 115.

The server 115 may be configured to communicate with the one or more sensors, local computing device 145, the remote computing device 135, and the control panel 130. The server 115 may perform additional processing on signals received from the one or more sensors 110, local computing device 145, and/or control panel 130, and/or may forward the received information to the remote computing device 135. For example, server 115 may receive identification and location data from one or more sensors 110 and may receive a communication request from remote computing device 135. Based on the received identification and location data, the server 115 may direct the received communication request to the appropriate one or more components of the home automation system, such as the control panel 130 and/or local computing device 145. Thus, the home automation system, by way of communications with server 115, may automatically direct incoming audio and video files from a remote caller to the appropriate microphone/speaker/video system in the home in order to enable one-way or two-way communication with other people.

Server 115 may be a computing device operable to receive data files (e.g., from sensors 110 and/or local computing device 145, and/or remote computing device 135), store and/or process data, and/or transmit data and/or data summaries (e.g., to remote computing device 135). For example, server 115 may receive identification data from a sensor 110 and location data from the same and/or a different sensor 110. In some embodiments, server 115 may "pull" the data (e.g., by querying the sensors 110, the local computing device 145, and/or the control panel 130). In some embodiments, the data may be "pushed" from the sensors 110 and/or the local computing device 145 to the server 115. For example, the sensors 110 and/or the local computing device 145 may be configured to transmit data as it is generated by or entered into that device. In some instances, the sensors 110 and/or the local computing device 145 may periodically transmit data (e.g., as a block of data or as one or more data points).

The server 115 may include a database (e.g., in memory) containing location, identification and/or authentication data received from the sensors 110 and/or the local computing device 145. Additionally, as described in further detail herein, software (e.g., stored in memory) may be executed on a processor of the server 115. Such software (executed on the processor) may be operable to cause the server 115 to monitor, process, summarize, present, and/or send a signal associated with resource usage data.

Figure 2:
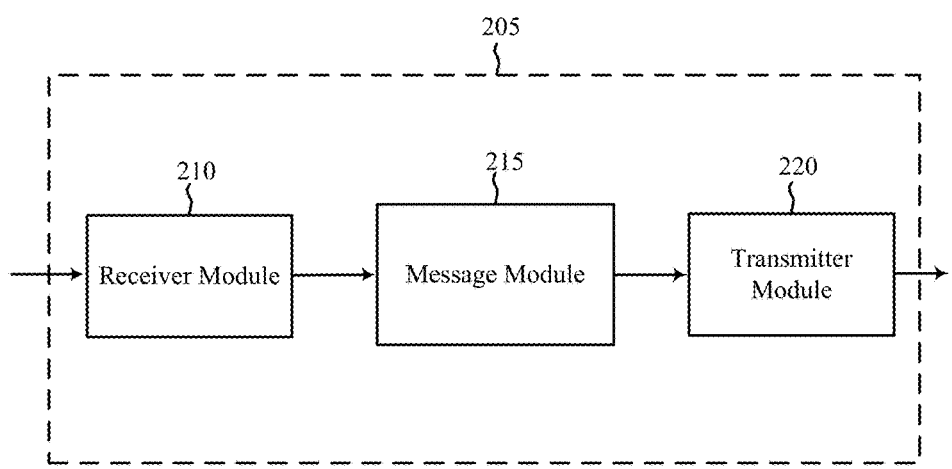
FIG. 2 shows a block diagram of a device relating to a security and/or an automation system, in accordance with various aspects of this disclosure.

FIG. 2 shows a block diagram 200 of an example apparatus 205 for use in electronic communication, in accordance with various aspects of this disclosure. The apparatus 205 may be an example of one or more aspects of a control panel 130, or in other embodiments may be an example of one or more aspects of the one or more sensors 110, or in still other embodiments may be an example of one or more aspects of remote computing device 135, each of which are described with reference to FIG. 1. The apparatus 205 may include a receiver module 210, a message module 215, and/or a transmitter module 220. The apparatus 205 may also be or include a processor. Each of these modules may be in communication with each other—directly and/or indirectly.

In one embodiment, where apparatus 205 is a control panel or a two-way communication camera, apparatus 205 may be a control panel in the form of an interactive home automation system display or apparatus 205 may be a stand-alone two-way communication camera. In some embodiments, apparatus 205 may be a local computing device 145 such as a personal computer or portable electronic device (e.g., smart phone, smart watch, tablet computer). In some embodiments, apparatus 205 may be coupled to at least one sensor 110.

The components of the apparatus 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, user data, and/or control information associated with various information channels (e.g., control channels, data channels, etc.). In one example embodiment, the sensors 110 may be cameras enabled to capture a plurality of audio and/or video files and/or other data such as identification data, event data, and/or action data. The sensors 110 may thus comprise or be coupled to identification and/or location detecting elements, such as motion sensors, biometric sensors, audio capture devices (e.g. a microphone), and the like. The receiver module 210 may be configured to receive audio, video, identification, location, and/or authentication data from the sensors 110. Received audio, video, identification, location, and/or authentication data may be passed on to a message module 215, which may then analyze and subsequently communicate the data to a transmitter module 220, and/or to other components of the apparatus 205. The transmitter module 220 may then communicate the data to the remote computing device 135, the control panel 130, or server 115.

In one embodiment, where the apparatus 205 is a control panel, the transmitter module 220 may communicate the audio, video, identification, location, and/or authentication data to the remote computing device; for example, the transmitter may communicate that a person has been detected as located in a pre-determined location. In some embodiments, the transmitter may communicate the determined identification of the person. In some embodiments, the transmitter may send video files captured at any of a plurality of cameras coupled to the system. In some embodiments, the transmitter may send audio files to a remote computer system.

Message module 215 may process and analyze information related to receiving, sending, and/or storing messages. In addition, message module 215 may process and analyze information related to determining the presence, identification, and/or location of at least one person. In one embodiment, a home environment may be contemplated, although the current description is not limited to a home environment and may be implemented in any other environment, for example, an outdoor location or a commercial location. In some embodiments, the presence of a person may be able to be determined versus the presence of a pet; for example based on height data, type of movement (e.g., gait), and/or visual and/or audio recognition.

In one example, apparatus 205 may be an example control panel, such as control panel 130, comprising or coupled to a microphone and/or camera and/or speaker device. In another example, the apparatus 205 may be a smartphone, a tablet computer, a laptop computer, etc. The apparatus 205 may be located in and outside of an example home, although other locations such as commercial or public locations may be contemplated. The apparatus 205 may be mobile (e.g., a tablet device) or may be mounted to a portion of the house such as to the wall or to another surface. In one embodiment, apparatus 205 may be coupled to an appliance (e.g., a refrigerator) In some embodiment, the apparatus 205 may be located outside of the house, such as at the front, back, or side entrances, or may be located within any one of the interior rooms. There may one or multiple apparatuses 205 located in or around a location.

In one embodiment, apparatus 205 may comprise a message module 215. Message module 215 may be enabled to receive, store, and/or transmit messages from a user, where the messages may be intended to be broadcast to another user. In some embodiments, a user may request to record a message at the control panel 130 and/or the camera within the home and transmit the recorded message to another device located within the home and/or located outside the home based on the intended recipient of the recorded message. In one embodiment, the request to record a message may be received by the message module 215 from a camera. In some embodiments, the recording of the message may be performed by the recordation module 305 as discussed in this disclosure. In addition, message module 215 may be enabled to determine the presence of a person, determine the identification of a person, determine the location of a person, and/or determine if a person is one part of a larger group of potential message recorders and/or message recipients, among other operations.

In some examples, apparatus 205 may be an example of a stand-alone two-way communication camera. In some embodiments, the message module 215 may be enabled to receive a request to record a message. In addition, message module 215 may be enabled to identify a recipient for the message based at least in part on the recorded message, or the request, or a combination thereof; and transmit the message to a device associated with the identified recipient.

For purposes of example and illustration, the following examples will be provided in the context of a house environment, where a father, a mother, a son, a daughter, and a pet dog. Other people may have access to the home such as a grandfather, a babysitter and/or a house keeper. It should be understood that the methods, techniques, and systems described herein are not limited to these example scenarios, and the methods, techniques, and systems may equally apply to any type of or number of household members, within a commercial setting, or within any other location with any number of participating members.

In one embodiment, apparatus 205 is a control panel or a camera enabling communication with another device located in at least one room of the house (i.e., structure), for example, the kitchen. In this example embodiment, a family member located in the house may wish to communicate with a family member located away from the house, but may not be able to communicate by way of a phone call or other methods. For example, a son may wish to leave a message for his mother at the mother's work place, but the son is not old enough to have or is not associated with a cellular phone or other device. Thus, the son may interact with the apparatus 205 to leave an audio/visual message for the mother, which may be captured by a microphone and/or a camera collocated with the apparatus 205, or in communication with the apparatus 205. In some embodiments, a person may want to leave a quick video/voice message to other people within the home without requiring live interaction. For instance, a parent may record an audio message using the two-way communication camera that may be broadcast to a child at the current time or at a later time. In further embodiments, the two-way communication camera may be enabled to broadcast messages to a remote device at a remote location outside the home.

In some embodiments, the son selects an option on the apparatus to record a message, for example, by selecting a "messaging" app on a touch screen coupled to or on the apparatus 205. The son may be then be recorded leaving a message. In some embodiments, the apparatus 205 may identify a recipient for the message based at least in part on the recorded message, or the request, or a combination thereof. In one embodiment, the apparatus may determine the recipient (e.g., mother) is located at a predetermined location during a predetermined period, where the message is transmitted during the predetermined period based at least in part on the determining whether the recipient is located at the predetermined location during the predetermined period. The son, for example, may indicate that the message is meant to be transmitted to the mother and may be sent to mother by way of a device, which may be based on determining the location of the mother and/or by the son's preference or specifying. The system may determine the mother is located in her office, and the message may be sent to the mother when she is located in her office (e.g., to a mobile device associated with the mother) or to the mother's office computer and/or phone and/or other communication device associated with the mother's office. This may be by way of a video command (e.g., "send to mom's office"), by way of an interaction with the software running on the apparatus 205, by way of other signals (e.g., hand signals, etc.), or the message module 215 may automatically determine the message is intended for the mother's office based on user-store preferences or other determinations. For example, the system may be pre-programmed to send any message the son records to the mother while she is located in her office. In other examples, the system may determine who the recipient of the message is and the location of the recipient based on artificial intelligence or context clues; for example, the system may determine the son is leaving a message for the mother based on the context of the message and determining the mother is located at her office (e.g., GPS tracking, time of day, day of the week, time of day, etc.).

Once the son records the message, the message may be stored in local memory and/or remote memory and/or may be transmitted to the mother. In some embodiments, the apparatus 205 may receive a pre-recorded message for an intended recipient from a remote device. In one embodiment, the apparatus 205 may identify the intended recipient based at least in part on the received message. For example, in some embodiments, the mother may respond to the son by sending a return message. In this example, the son does not have a cellular phone or is not associated with a similar device, so the mother's return message may be sent to the apparatus 205 (e.g., two-way communication camera, the control panel 130). However, in other embodiments, the return recipient (e.g., son) may have sent the message from the two-way communication camera or the control panel 130, but may have a computing device and/or be associated with a computing device, and thus the return message may be sent to a local and/or remote computing device. In some cases, a message may be recorded at apparatus 205 and intended to be broadcast when a specific person is identified as located in a specific location, as discussed in embodiments relating to FIGS. 3, 4, 5A, 5B, 6A, and 6B, among others.

Figure 3:
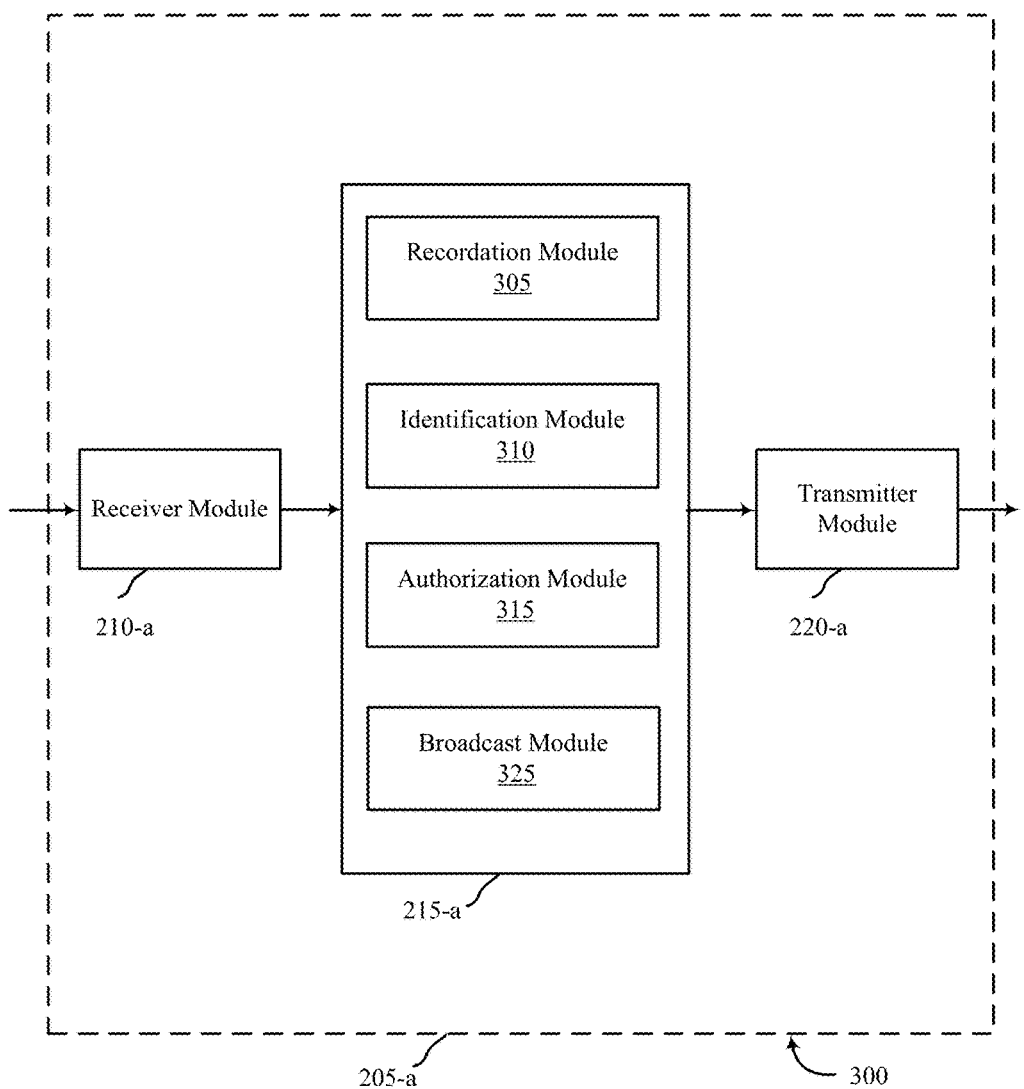
FIG. 3 shows a block diagram of a device relating to a security and/or an automation system, in accordance with various aspects of this disclosure.

FIG. 3 shows apparatus 205-a, which may be an example of apparatus 205 illustrated in FIG. 2, in accordance with at least some embodiments. Apparatus 205-a, may comprise any of a receiver module 210-a, a message module 215-a, and/or a transmitter module 220-a, each of which may be examples of the receiver module 210, the message module 215, and the transmitter module 220 as illustrated in FIG. 2. Apparatus 205-a may further comprise, as a component of the message module 215-a, any or all of the following sub-modules: recordation module 305, identification module 310, authorization module 315, and/or broadcast module 325.

The components of apparatus 205-a may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

In one embodiment, recordation module 305 may receive data related to a video and/or audio and/or audio/video message. For example, recordation module 305 may receive a command from the son and/or from another device to begin recording a message at the control panel 130 or a stand-alone two-way communication camera located in the kitchen. Thus, the recordation module 305 initiates the microphone and/or camera to begin receiving signals.

In some embodiments, the recordation module 305 may enable the microphone and/or camera to begin receiving data and recording when motion, heat, and/or sound is detected. For example, a camera outside of the house (e.g., a doorbell camera, a front entry camera, a backdoor camera, etc.), may individually determine, or may be coupled to a system that determines, that a person is within a capture range. The microphone and/or camera may then begin recording and may continue recording until the presence of the person is no longer detected. The recording may be stored as previously discussed and/or transmitted to an intended recipient.

In some embodiments, the recordation module 305 may receive a request from a user directly and/or indirectly at the control panel 130 or from a camera. For example, a user within a home may walk-up to the control panel 130 or a camera and input a request directly at the control panel 130 interface (e.g., GUI interface associated with the control panel 130) or at the camera. A request may include, but is not limited to, recording an audio message, or a video message, or a combination thereof. In some embodiments, the request may include, but is not limited to, a verbal command, tactile input, and/or gesture performed by a user. For instance, a user may speak a command (e.g., "Record message") at the control panel 130 or a camera requesting to record a message. In some embodiments, the user may request to record a message based on a tactile input at the control panel 130 or the camera (e.g., two-way communication camera). In some embodiments, the control panel 130 or the camera may include an interactive surface (e.g., touch screen, push buttons, etc.) on which a user may perform one or more inputs. In other embodiments, the camera may be a stand-alone camera. The stand-alone camera may be located within a home. In some embodiments, the stand-alone camera may be absent of any display screen (e.g., GUI interfaces).

In some embodiments, the recordation module 305 associated with the control panel 130 or a camera may receive a request indirectly from a device associated with the user. For example, a user may receive and/or transmit signals (e.g., information, requests, data, etc.) from and/or to one or more components of the home automation system (e.g., control panel 130, camera) via an application executing on his device. In some embodiments, the application executing on the user's device may allow the user to transmit and/or broadcast signals (i.e., requests) to the control panel 130 or a camera from a location outside the home. In other embodiments, the control panel 130 and/or the camera may receive a pre-recorded message for an intended recipient from the remote computing device 135. For example, a mother at work may want to record a message on her remote smartphone, and transmit the recorded message to the control panel 130, one or more local computing devices 145, and/or a camera located within the home, for her husband and/or children to view.

In some embodiments, the audio message, or the video message, or the combination thereof may be associated with a predetermined duration. For example, a user may record an audio message, or a video message, or a combination thereof based on a setting, for example, a predetermined duration (e.g., 30 seconds, 1 minute, etc.) maximum that is preprogrammed with the home automation system. In some embodiments, the predetermined duration maximum may be associated with a device receiving the request to record the message. For example, a user requesting to record a message at the control panel 130 without transmitting the recorded message to another device, for example one or more local computing devices 145 and/or remote computing devices 135, may have a predetermined duration that is greater than if the user is requesting to record a message at the control panel 130 and transmit the recorded message to one or more other devices located within the home and/or outside the home. In further embodiments, the predetermined duration may be smaller when a user is requesting to record a message on his device and transmit the recorded message to one or more components (i.e., control panel 130, local computing device 145, remote computing device 135, camera) of the home automation system.

In other embodiments, the predetermined duration of the recorded message may be based on the type of message a user is requesting to record. For example, an audio message may be assigned a first predetermined duration maximum, a video message may be assigned a second predetermined duration maximum, and a message that may include a combination of an audio message and a video message may be assigned a third predetermined duration maximum. In some cases, at least some of these durations may be the same or different. In some embodiments, the first predetermined duration maximum, the second predetermined duration maximum, and/or the third predetermined duration maximum may have a different value (e.g., seconds, minutes, hours, bits, bytes, etc.) and/or the same value (e.g., seconds, minutes, hours, bits, bytes).

In other embodiments, a user may request to record a message at the control panel 130 and/or the camera within the home and transmit the recorded message to another device located within the home and/or located outside the home based on the intended recipient of the recorded message.

In one embodiment, identification module 310 may enable detection of the presence of and/or identification of a person by way of sensors, including sensors which capture biometric data, proximity data, and other electronic signals which may determine the presence and/or identification of a person.

The identification module 310 may receive and analyze identifying information related to a person such as a voice print, a finger print, retinal identification, clothing, facial recognition information, height, a hair color and/or length, a body type and/or shape, other physical features, identifying marks such as tattoos and/or birthmarks, other biometric information, and/or some combination. In other embodiments, a device associated with the person may be read for information by way of a magnetic scanner, a radio frequency identification (RFID) chip, a sub-dermal electronic device, a quick-response (QR) code, a bar code, GPS, Bluetooth, etc. In yet other embodiments, a personal identification number may be keyed into a input device (e.g., touchscreen, keypad). In other embodiments, a geo-fence may be established around the location, and it may be determined that a portable electronic device associated with the person and crossed into or out of a geo-fenced location. Regardless of the type of identification, the data may be compared to a user profile and/or other data stored in memory and the person may be identified. This identification may, in some embodiments, be based on a confidence level and/or probability based on the received data. In some embodiments, the data may be compared to data associated with a user profile stored in the cloud or on a remote server, or associated with a third party.

In some embodiments, identities may be established based on a known user profile related to one or more locations. For example, there may be a plurality of previously stored user profiles that contain a variety of identifying features, authorizations, and/or preferences associated with a specific person. Thus, when a specific person is identified, the system may take an action indicated by the person's identity. In some embodiments, one or more distinct types of information may be received, analyzed, weighed, and/or compared to determine an identity.

The biometric identification captured may include determining the identity of a person by way of identifying the location of a user's portable electronic device through GPS. The identification data received by the identification module 310 may be communicated to transmitter module 220-a, which may communicate the data to the remote computing device. In addition, the identification module 310 may comprise a motion sensor, a retinal scanner, a fingerprint scanner, a voiceprint sensor, a camera calibrated to identify facial structure, a GPS receiver or a input device (e.g. a keypad) into which a user may input a PIN or any other known identification detection means to detect the presence of a user and to determine the user's identity at or near any of the plurality of cameras.

In some embodiments, the identification module 310 associated with the control panel 130 and/or the camera may identify a recipient for a recorded message. For example, the identification module 310 may identify a recipient for a recorded message based on the recorded message, or the request, or a combination thereof. In one embodiment, a user may identify an intended recipient based on the request to record the message. For example, in one embodiment, a user may speak a command at the control panel and/or the camera identifying an intended recipient (e.g., "Record message for Mom," "Record message for Parents," "Record message for [group]"). In some embodiments, a user may input at the control panel 130 or the camera identifying an intended recipient based on a preprogrammed directory (e.g., phonebook, user profiles, alphanumeric identifier input, audio input, visual identifier, etc.) stored in memory of the control panel 130 and/or one or more other components of the home automation system. In some embodiments, a user may input at a camera an intended recipient based on a tactile input on the camera. For example, a camera may have one or more buttons on it and/or associated with it. The camera may identify an intended recipient based on, but is not limited to, a number of times the user presses a button on the camera and/or a duration associated with pressing the button. In some embodiments, the camera may receive a verbal command from a user identifying an intended recipient. In other embodiments, the control panel 130 and/or the camera may identify an intended recipient for a recorded message based on gesture performed by the user. In further embodiments, the control panel 130 and/or the camera may identify an intended recipient based on receiving an alpha numeric identifier. For example, a user may input a phone number at the control panel 130 and/or the camera for an intended recipient.

In some embodiments, the identification module 310 associated with the control panel 130 and/or the camera may perform one or more speech processing algorithms and/or image processing algorithms on one or more inputs (i.e., a verbal command, a tactile input) received from the user to identify an intended recipient. For example, in some embodiments, a speech processing algorithm may be applied to a recorded message to identify an intended recipient. The identification module 310 may execute a speech processing algorithm that may search and identify pronounced names in the recorded message and compare the names to pre-stored user names in memory of one or more components of the home automation system. For example, the speech processing algorithm may identify that a user (including cases where the user is or is not identified based on one or more known users associated with a home or an automation system device) pronounced "John" in his recorded message. The identification module 310 executing the speech progressing algorithm may then parse a database associated with pre-stored user profiles (e.g., phonebook directory, user profiles) for an instance of "John". The identification module 310 may then identify that the intended recipient for the recorded message is John.

In some embodiments, a recorded message may include two or more pronounced names. The identification module 310, may apply a weighting factor to each pronounced name for identifying an intended recipient. For instance, if a user mentions "John" multiple times in his recorded message as compared to "Mary", the identification module 310 may identify the intended recipient as "John". In some embodiments, the identification module 310 may identify an intended recipient for a recorded message based on a time when an instance associated with a pronounced name occurs during the recorded message. For example, a recorded message may include a father leaving instructions for his child to perform chores when he comes home from school and notifying his child that his mom will be coming home late, the recorded message may then end with the father saying the child's name. Or, in other cases, the identification may be based on a name being recorded at a beginning of a message. Alternatively, in some cases, the identification may be based on a name being recorded at a time distinct from the recorded message (e.g., before or after). The identification module 310 may identify two instance of a pronounced name (e.g., mom and the child's name), since the child's name was the last instance, the identification module 310 may identify that the intended recipient is the child.

In some embodiments, identification module 310 may receive location information associated with an intended recipient relative to the two-way communication camera or the control panel 130. In some embodiments, identification and location data may be detected continuously at apparatus 205-a or at predetermined times and intervals. In other embodiments, identification and location data may be detected at apparatus 205-a at the instruction of a user. In yet other embodiments, the identification of a user may be determined when the presence of a person is determined at a location. In some embodiments, the collected identification and location data may be communicated by way of transmitter module 220-a in real-time to the processor or remote computing device, while in other embodiments, the collected identification and/or location data may be time stamped and stored in memory integrated with the apparatus 205-a, stored in the network 120, and/or stored on the server 115 (as shown in FIG. 1).

In some embodiments, the identification module 310 may determine whether an intended recipient is located at a predetermined location during a predetermined period. In some embodiments, the identification module 310 may determine whether an intended recipient is located at a predetermined location during a predetermined period based on a schedule associated with the intended recipient.

In further embodiments, the identification module 310 may identify a predicted location associated with the identified recipient based at least in part on a schedule associated with the identified recipient, wherein the message is transmitted based at least in part on the predicted location associated with the identified recipient. For example, the identification module 310 may determine that the son is leaving a message for the mother based on the context of the message and determine that the mother is located at her office based at least in part on received schedule data (e.g., schedule, time of day, day of the week, time of day).

In some embodiments, the identification module 310 may determine whether an intended recipient is located at a predetermined location based on received schedule data alone or in conjunction with tracking data (e.g., GPS data) received from a device (e.g., remote computing device 135) associated with the intended recipient. In some embodiments, the schedule may be based at least in part on data captured by a camera (e.g., apparatus 205, two-way communication camera, control panel 130). In other embodiments, the schedule is based at least in part on data captured within a structure associated with the camera. For example, the control panel 130 and/or the camera in communication with one or more other components (e.g., sensors 110) may generate a schedule for each user within the home based on behavioral patterns or tendencies of one or more users. For example, a user may rarely update his schedule (e.g., actual work hours, such as within a calendar, to reflect an actual schedule of the user). The identification module 310 may retrieve signals (e.g., a device location, execution of a work-related app, access to a network VPN, voice recognition, facial recognition, participation in a conference call from home) and generate a set of user behavioral patterns that may be indicative of recurring patterns of the user. The identification module 310 may then determine a location of the user based on the generated schedule using the behavioral patterns. In some embodiments, the identification module 310 may retrieve data stored on the device of the user and correlate the retrieved data with the behavioral patterns captured by the camera within the home. The data may include, but is not limited to, a work schedule, a school schedule, membership, etc.

In some embodiments, the identification module 310 may determine the predetermined location of a recipient and send a message based on the predetermined location (e.g., the mother is located in her office), and the message may be sent to the mother when she is located in her office (e.g., to a mobile device associated with the mother) or to the mother's office computer, phone, pager, email, and/or other communication device associated with the mother's office. In some embodiments, the identification module 310 may indicate to the broadcast module 325 to broadcast a message based at least in part on pre-stored schedule data associated with the mother known by the automation system. For instance, the identification module 310 may indicate to the broadcast module 325 to broadcast the message to the mother's office based at least in part on the pre-stored schedule data associated with the mother, that may indicate that mother is in her office between the hours of 8:00 am to 6:00 pm.

Authorization module 315 may make a determination as to whether the person is part of an authorized and/or intended group of message recipients. For example, the son and daughter may be in the "children" group, whereas the parents may be in the "adult" group. In another example, the son, daughter, mother, and father may be in the "family" group, whereas the babysitting may not be in the "family" group, but may be part of the "authorized recipients" or the "known visitor" group, where the "authorized recipients" or the "known visitor" group includes the four family members, the babysitter, the housekeeper, and the grandfather.

In some embodiments, the authorization module 315 may receive information from a user which delineates groups. For example, the authorization module 315 may be programmed with user profiles. The user profiles may include names, identifying information and data (e.g., stored passwords, codes, photographs, fingerprints, retinal data, voice data), and may also include data such as contact information (e.g., phone numbers, electronic mail addresses, etc.) and whether the person is part of an authorized and/or intended recipient group.

In other embodiments, the authorization module 315 may use artificial intelligence and/or context clues to determine if a person is authorized. The system may identify the person based on data in a stored profile, or may fail to identify a person based on lack of data or a lack of a profile associated with the received identification data; however, a person may be identified and not be authorized, or may be authorized but may not have a stored profile, but rather a temporary authorization. For example, the system may determine the message contains the words "surprise party" and make the determination that all of the household members are part of the authorized group except for the father, based on the fact the system knows the father's birthday is the same month the message is recorded.

In some embodiments, the broadcast module 325 may transmit a recorded message during a predetermined period based on an intended recipient being located at a predetermined location during the predetermined period. In another example, the system may not have any data stored for a babysitter, but recognizes that every Thursday between 2 p.m. and 5 p.m., the same person is in the house and/or performs similar tasks and/or saying similar phrases (e.g., feeding the child, changing the child, in the playroom with the child, "your parents will be home soon"). Thus, the system may broadcast a message to the babysitter if the mother indicates the babysitter is the intended recipient even if there is no stored profile that the babysitter is identified and/or authorized. Or, in alternative cases, the system may store a standard message to babysitters and/or children related to when one or both parents are gone, even if the same babysitter is present. This message may provide information to the babysitter and/or may be a message to the children to complete a task or tasks (e.g., chores, get ready for bed, help the babysitter).

In one embodiment, broadcast module 325 may be enabled to receive a plurality of audio and/or video messages and related data. In some embodiments, the broadcast module 325 may transmit a recorded message to a device associated with an intended recipient. In one embodiment, the recorded message may be transmitted from the control panel 130 to the remote computing device 135 and/or the local computing device 145 via network 120. In some embodiments, the recorded message may be transmitted from the control panel 130 the remote computing device 135 and/or the local computing device 145 via the server 115. In one example, the broadcast module 325 may receive data in the form of metadata associated with the audio and/or video messages which indicate how and when to broadcast the messages, the location and/or other information associated with one or more messages. For example, the broadcast module 325 may broadcast the message if the identified person in a location is determined to be the intended recipient, but will otherwise continue to store the message in memory until the correct recipient is identified.

In some embodiments, the broadcast module 325 may broadcast a portion of a pre-recorded message based at least in part on an identified intended recipient. In some embodiments, the broadcast module 325 may transmit and/or broadcast the message independent of user input on a device (e.g., two-way communication camera or control panel 130). In some embodiments, the pre-recorded message may include, but is not limited to, any of an audio message, or a video message, or a combination thereof. In some embodiments, the broadcast module 325 may broadcast an audio component of a pre-recorded message based at least in part on determining that an intended recipient is within a predetermined distance from the two-way communication camera or the control panel 130. In further embodiments, the broadcast module 325 may broadcast and/or transmit a video component of the pre-recorded message to a device associated with the two-way communication camera (e.g., control panel 130).

The broadcast module 325 may broadcast the message by way of an audio playback through speakers, by way of a video playback on a display device, a combination of audio and video, and/or may broadcast the message by way of a three-dimensional display, such as a hologram.

In some embodiments, the broadcast module 325 may broadcast the recorded message based on predetermined distance of the user. For example, in some embodiments, a user may request to record a message at the control panel 130 and/or the camera within the home and transmit the recorded message to another device located within the home and/or located outside the home based on the intended recipient of the recorded message. In some embodiments, the control panel 130 and/or the camera may broadcast a recorded message based on a predetermined distance between the intended recipient and the control panel 130 and/or the camera. The broadcast module 325 associated with the control panel 130 and/or the camera may receive location information from one or more sensors 110 located within and/or outside the home. The location information may indicate a distance between the intended recipient and one or more devices (e.g., the control panel 130, the camera). In some embodiments, the control panel 130 and/or the camera may broadcast an audio component of the recorded message when the intended recipient is within a predetermined distance from the control panel 130 and/or the camera.

In some embodiments, the broadcast module 325 may broadcast an audio component of the recorded message when the intended recipient is within a predetermined distance from the control panel 130 and/or the camera and transmit a video component of the pre-recorded message to a device associated with the camera and/or the control panel 130. In instances, where the recorded message includes a video component and an audio component, the broadcast module 325 may broadcast the video component on a display component (e.g., a first device, the control panel 130) and the audio component via a second device (e.g., a camera, a speaker). Alternatively, the camera may be a stand-alone device on a counter top or other surface, or may be mounted. The camera may broadcast the audio portion of the recorded message but not the video component of the message (due to capability, programming, to reduce wireless communication traffic, lacking a screen).

In some embodiments, transmitting the recorded message to the device of the intended recipient may include broadcasting the recorded message to one or more messaging interfaces (e.g., email, SMS, voicemail, etc.) associated with the device.

In some embodiments, a message may be assigned a priority value by the person recording the message. In other embodiments, the message may be automatically assigned a priority level by the system based on context data and other received or identified data. For example, the mother may record a message about picking up the son from school and does not care who specifically receives the message, only that the first person to enter the house receives the message. Thus, the mother may indicate the message is of a high priority. Likewise, the message may be indicated to be of a higher priority than other messages that may have been recorded, and thus the message may be broadcast first before any other message that was stored.

In other examples, the system may recognize specific words and/or actions and/or events and assign a priority level automatically. For example, the system may recognize the sound of a fall, a scream, the word "help," etc., record a message, and indicate the message is of the highest priority. Thus, the messages may be assigned any of a number of priority levels, and the system will broadcast the messages based on the priority levels.

In other embodiments, the brightness and/or volume of the broadcast message may change. In some cases, the broadcast settings may vary based on the priority level; in other cases, the broadcast settings may be based on personal preference, time of day, etc. In yet other cases, the system may adjust the brightness and volume based on ambient noise and/or detection of actions (e.g., family is watching a movie, having dinner, etc.)

Figure 4:
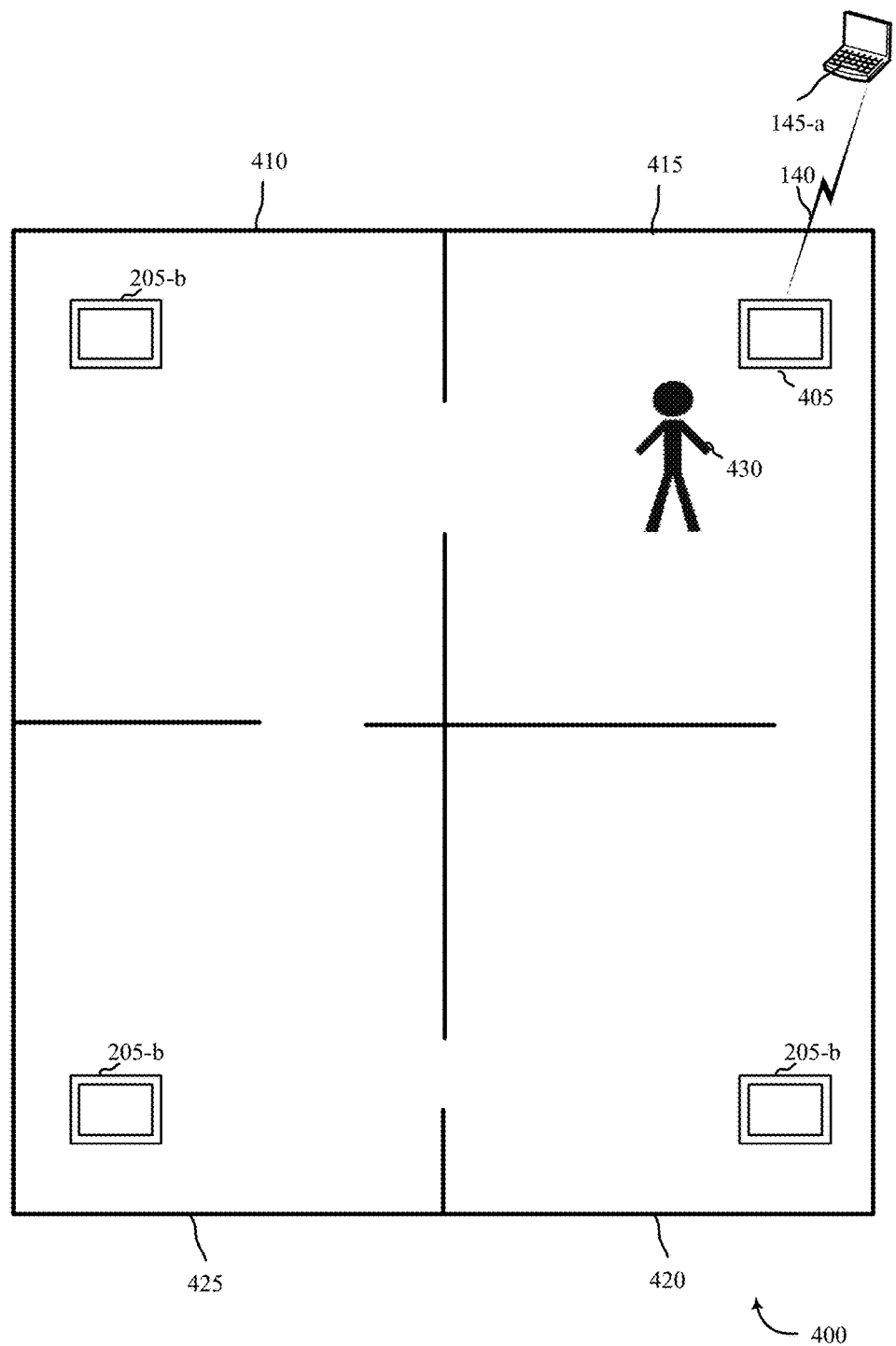
FIG. 4 shows an overhead diagram of an example security and/or an automation system, in accordance with various aspects of this disclosure.

FIG. 4 shows an overhead diagram of an example security and/or an automation system, in accordance with at least some embodiments. House 400 (i.e., structure) comprises four rooms 410, 415, 420, and 425. Rooms 410, 420, and 425 are equipped with an apparatuses 205-*a* and 205-*b* described with respect to FIGS. 2 and 3. Room 415 is equipped with apparatus 405, where apparatus 405 may be apparatus 205 described previously, among others.

In this embodiment, room 410 may be a living room, room 425 may be a bedroom, room 420 may be a dining room, and room 415 may be a kitchen. Although FIG. 4 only depicts a communication link between apparatus 405 and a remote computing device 145-*a*, it is possible that any of the apparatuses 205-*b* within house 400 are communicatively coupled to the remote computing device 145-*a* and/or each other. In addition, any of the apparatuses 205-*b* and/or 405 may be communicatively coupled to a local computing device, a server, a cloud server, etc.

In one example embodiment, person 430 may be the son from the previous examples. The son would like to leave a message for his mother, but he does not have a cellular phone or other means of communication available to him. The son thus interacts with apparatus 405 to leave a message for his mother at her office. Thus, remote computing device 145-*a* may be a computing device located with the mother in her office. Although FIG. 4 shows person 430 in room 415, person 430 may record, transmit, and receive messages from any of the rooms 410, 415, 420, and/or 425 using apparatus 405 and/or any of apparatuses 205-*b* shown.

In one embodiment, the son interacts with software running on the apparatus and indicates he would like to record and transmit a message from the house 400 to remote computing device 145-*a* (at a later time and/or in pseudo or actual real-time.). The apparatus 405 receives the indication a message is to be recorded and initiates the recording process. The recording may be audio alone, video alone, and/or a combination of audio and video, among other things.

In one embodiment, the person 430 may make a manual, a voice, a visual, and/or a tactile selection on the apparatus 405 (e.g., on a touchscreen or input device) to indicate the message is intended for remote computing device 145-*a*. In some embodiments, person 430 may verbally state the message is meant for remote computing device 145-*a* and/or for a specific person (e.g., mom). In some embodiments, apparatus 405 may determine the message is intended for remote computing device 145-*a* based on context clues or other data, including, but not limited to, the day of the month, the day of the week, the time of day, words identified, actions (e.g., facial, hand, body movements) identified, sounds (e.g., sirens, voices, barking, etc.), recent messages and actions, etc. For example, the apparatus 405 may determine that person 430 (in this case the son) only sends messages to his mother at his office, and thus the message is intended for remote computing device 145-a.

In some embodiments, the remote computing device 145-a may send a return message to person 430. In this case, apparatus 405 may broadcast and/or display the return message to person 430. The message may be audio, video, and/or a combination of audio and video, among other things. In some case, the message may be broadcast as a three-dimensional message, such as a hologram or other projection.

In other embodiments, apparatus 405 may determine the presence and identification of person 430 in the kitchen, and begin recording a message meant for remote computing device 145-a regardless of any input from person 430.

In each case, the message may be stored in local memory, remote memory, on a remote server, or in the cloud, and may be transmitted immediately, or may be stored for transmission at a later time. The time at which the message may be sent may be user-specified or pre-programmed. For example, the message may be broadcast when a specific event occurs (e.g., a person in a room at an identified time, a specific person in any room at a time, any person in any room at a specific time, etc.). In other examples, the message may be broadcast at a specific time regardless of any other data received or determined.

Figure 5A:
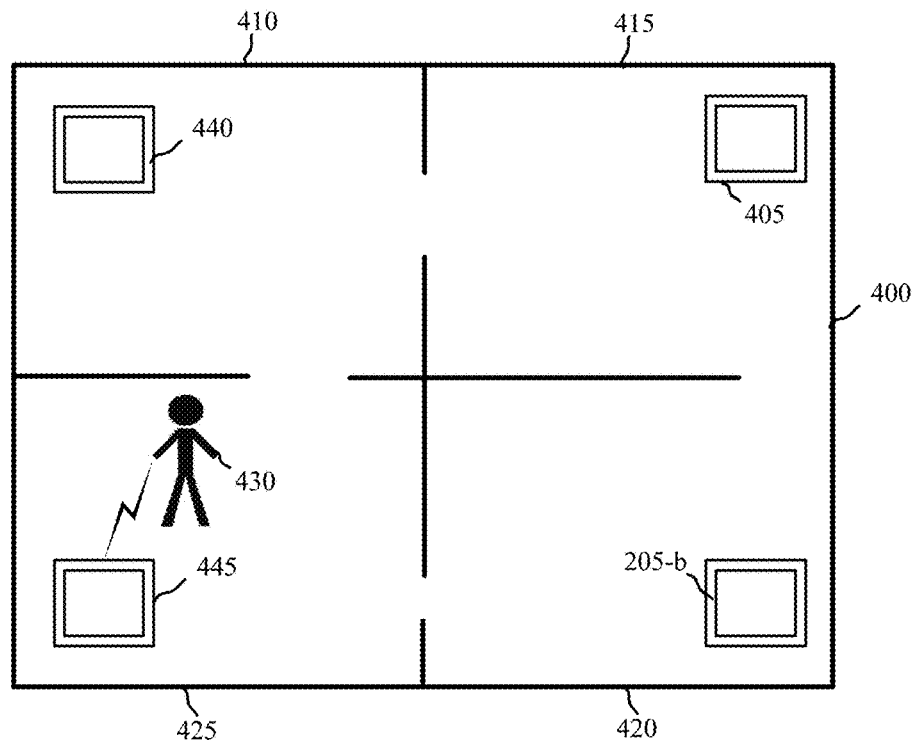
FIGS. 5A and 5B show overhead diagrams of an example security and/or an automation system, in accordance with various aspects of this disclosure.
Figure 5B:
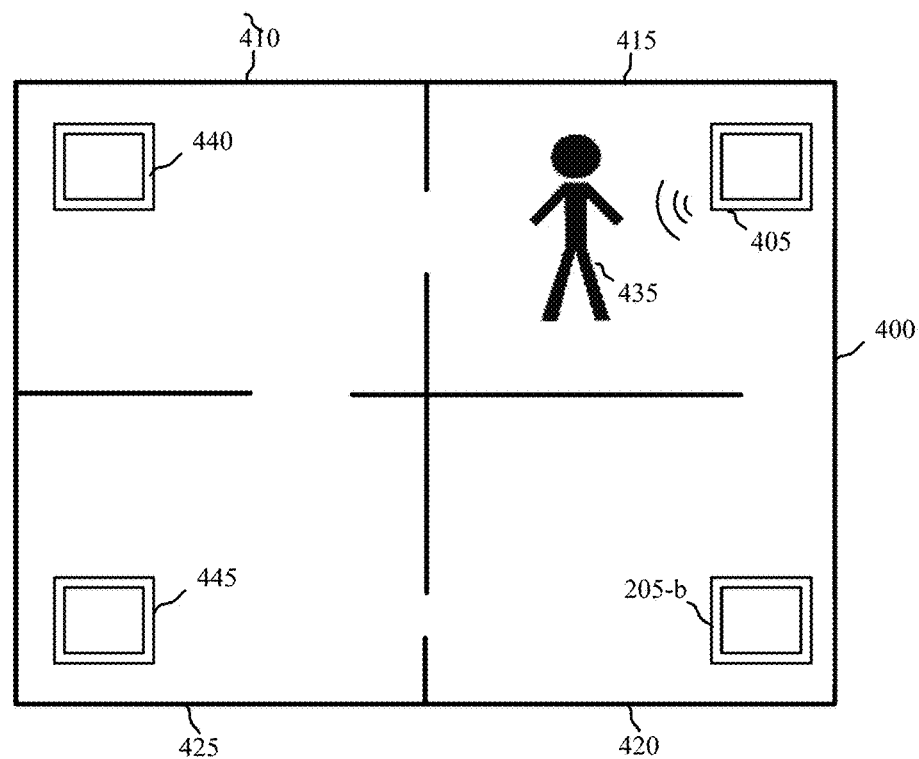

FIG. 5A and FIG. 5B show overhead diagrams of an example security and/or an automation system, in accordance with at least some embodiments. FIG. 5A shows house 400 with rooms 410, 415, 420, and 425, where each room is associated with an apparatus 440, 405, 205-b, and 445, respectively. Apparatuses 440, 405, 205-b, and 445 may be examples of apparatus 205, 205-a, and/or 205-b described previously, among others.

In one embodiment, person 430 (e.g., the son), may be in room 425 (e.g., his bedroom). He still does not have and/or is not associated with a cellular phone or another device, but he is planning to go to play with a neighborhood friend and wants his mother to know his whereabouts when she arrives home. Thus, he leaves an audio and/or video message and/or notification at apparatus 445. In this embodiment, the message or notification will be stored until the system determines the son's mother arrives home, at which point the system will broadcast the message or the notification to her. The message may be stored locally on any or all of the apparatuses, or remotely on a server or in the cloud. If the message is stored locally, for example, at apparatus 445, when the system determines the mother has arrived at home, the message may be transmitted from apparatus 445 to the appropriate apparatus in the room where the mother is located.

In FIG. 5B, the son (i.e., person 430) has left the house and person 435 arrives at the house. In this example, person 435 is the mother and the intended recipient of the son's message. When the mother arrives home, the system determines her presence and correctly identifiers her as the mother and the intended recipient of the son's message. Thus, while the mother is standing in room 415, apparatus 405 broadcasts the son's message to her. In this example, the mother is located in the kitchen, but she may receive the message in any of the rooms that are enabled to receive the message and broadcast the message using one or more of apparatuses 205-b, 405, 440, and/or 445. In some embodiments, the mother may change locations in the home and she may receive the message as a continuous recording and/or as two or more segments in any of the rooms that are enabled to receive the message and broadcast the message using one or more of apparatuses 205-b, 405, 440, and/or 445.

If person 435 is not the mother, and the son has indicated the message is only intended for the mother or the system has determined that the message is not intended for the sister, then the system will not broadcast the message regardless that person 435 is located in one of the rooms.

In some embodiments, the son's message may be that he left home and that he took the trash out before leaving. Thus, he not only wants his mother to receive the message, but he would like her to receive the message when she enters a predetermined and/or a designated location relevant to the person (e.g., son, mother) and/or the content of the message (e.g., kitchen room, kitchen garbage, chores) so that the mother does not have to check the trash. Thus, the son's message will be broadcast to the mother when the system not only identifies her, but also determines the mother is located in the predetermined location (i.e., room 415 as an example of a kitchen).

In some embodiments, the son wants to leave a message that he took out the trash and went out to play, but it does not matter to the son who in the family receives the message, only that some family member receives the message while in the kitchen. Thus, the system may broadcast the son's message when any of the family members are identified as being located in the kitchen. If a person is determined to be in the kitchen, but the person is not one of the family members, the system will not broadcast the message.

In some embodiments, the system may recognize the message is meant for a specific recipient without being specifically instructed to broadcast the message to a specific recipient. For example, the father may leave a message for the daughter about picking her brother up after tennis practice, however the father may not specifically indicate the message is for the daughter, and also does not mean for the message to be for the mother. The message may therefore state: "Please pick up Adam after tennis practice." The system may know the sister has tennis practice, and thus when the system identifies the sister in the house, the system knows the message is meant for the daughter. In some embodiments, the data which enables the system to make such determinations may be programmed into a user profile. In other embodiments, the system may use artificial intelligence methods, computation intelligence, such as neural networks and fuzzy systems, and other cognitive learning to identify people, events, and intended outcomes.

In some embodiments, the message may be sent from a remote computing device, and stored on one of the apparatuses. The message may then be broadcast when the correctly identified person is located in the correct location, or as otherwise indicated by the person recording the message. For example, the person recording the message may indicate specific instructions for broadcasting the message including the number of times the message may be broadcast, the allowed locations (or black-listed locations), the intended recipients, the day and time of day, etc.

Figure 6A:
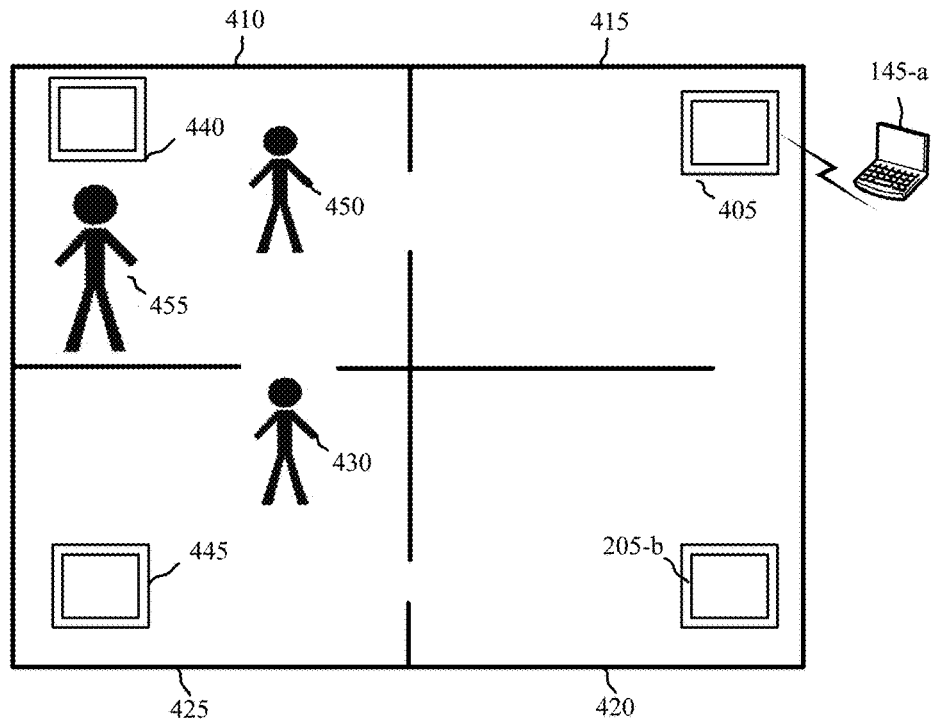
FIGS. 6A and 6B show overhead diagrams of an example security and/or an automation system, in accordance with various aspects of this disclosure.
Figure 6B:
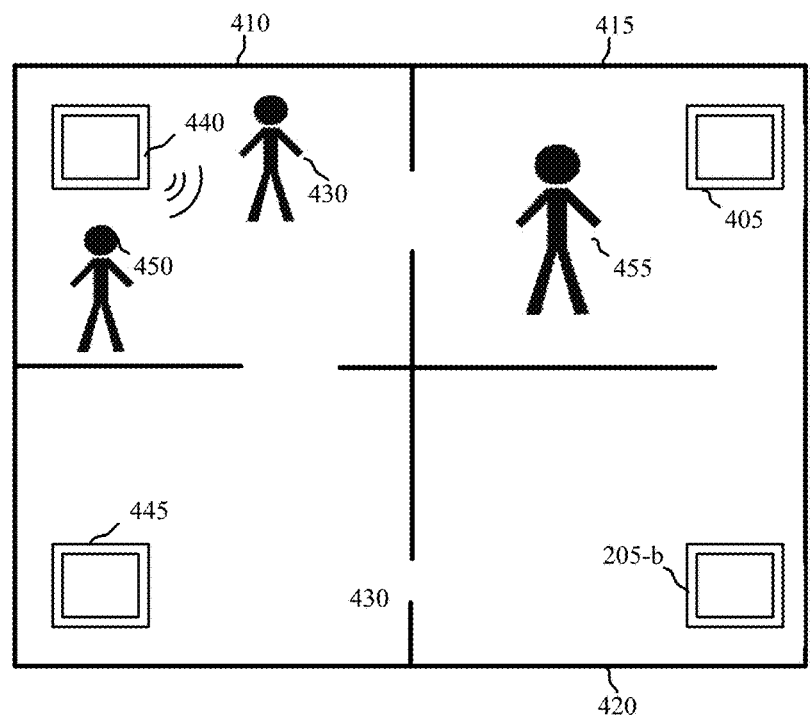

FIG. 6A and FIG. 6B show overhead diagrams of an example security and/or an automation system, in accordance with at least some embodiments. In FIG. 6A, a message is left for person 430. The message may be transmitted from a remote computing device 145-a to any of the apparatuses 440, 405, 205-b, and/or 445. Further, any or all of the apparatuses may store the message to be delivered according to the instructions or preferences related to the message. Although not specifically shown, the message may have been left by a person directly and manually interacting with one the apparatuses while in the same location as the apparatus. Regardless of how the message is recorded, the message in this example embodiment may be recorded by the mother and intended for the son (i.e., person 430) and/or the daughter (i.e., person 450), but is not intended for the father (i.e., person 455). For example, the mother may be leaving the children instructions about a surprise party for the father, about chores, and/or homework.

The son and daughter may comprise a group called the "children," where parameters and data associated with the son and daughter are stored in a user profile (e.g., identification information, preferences, etc.). In some embodiments, a message may be left for a specific person, or an intended and/or authorized group of recipients. In some cases, if any of the group of recipients is present, the message may be broadcast; however, in other cases the entire group may have to be present to receive the message. In yet other embodiments, only the intended recipients may be present in order to receive the message. In some embodiments, the message may not be broadcast and/or conveyed even if one or more recipients is present, if other non-family and/or non-authorized recipients are present.

In FIG. 6A, the message recorded is intended for the "children" group and the mother may have further indicated the message is solely intended for the members of the "children" group; thus, when the daughter (i.e., person 450) and the father (i.e., person 455) are in room 410, the recorded message will not be broadcast because the father is not part of the intended group and is present in the room.

In FIG. 6B, the father has left room 410 and moved into room 415. The son (i.e., person 430) has moved into room 410. Now only the members of the intended group are present, and the message is broadcast from apparatus 440. In some embodiments, if the father has left the room, and the son had not entered the room, the message may still have been broadcast because the daughter is at least one of the members of the intended group. In other embodiments, the message may be broadcast only to the intended recipients if the intended recipients are in the correct location. For example, the mother may indicate the message should be broadcast to the son and/or daughter, but only if the son and/or daughter are in a certain location (e.g., the kitchen). In some embodiments, this constraint may be based on a user preference and/or input, and/or may relate to the content of the message to be conveyed. For example, if the message relates to reminder one or more children about a chore to performed in the kitchen, the message may be played at this location.

In some embodiments, a message may be recorded, but the specific location in which the message is broadcast is less relevant or unspecified. For example, in these embodiments, the message may be broadcast any time anyone enters any room. In other examples, the message may be broadcast in any room where a specifically intended recipient is determined to be located. In yet other examples, the message may be broadcast in a specific room, but the recipient is irrelevant, and thus any person determined to be located in the room will hear the message.

In some embodiments, the system may send a notification to the person who left the message to indicate when, where, and to whom the message was broadcast. For example, the mother may record a message. The system may identify the father, in the kitchen, at 5:04 p.m., and broadcast the message. Subsequently, the system may send notification to the mother that the father received the message when he was in the kitchen at 5:04 p.m. In other examples, the system may identify a person in a location at a time and request permission from the message recorder (e.g., the mother in the previous example), about whether the message should be broadcast to the identified person, in the identified location, and/or at the current time.

In some embodiments, one message may be recorded but may be repeated at different times, in different locations, and for different recipients. For example, the mother may leave a message for all of the children to be broadcast for each child as each child returns home.

Figure 7:
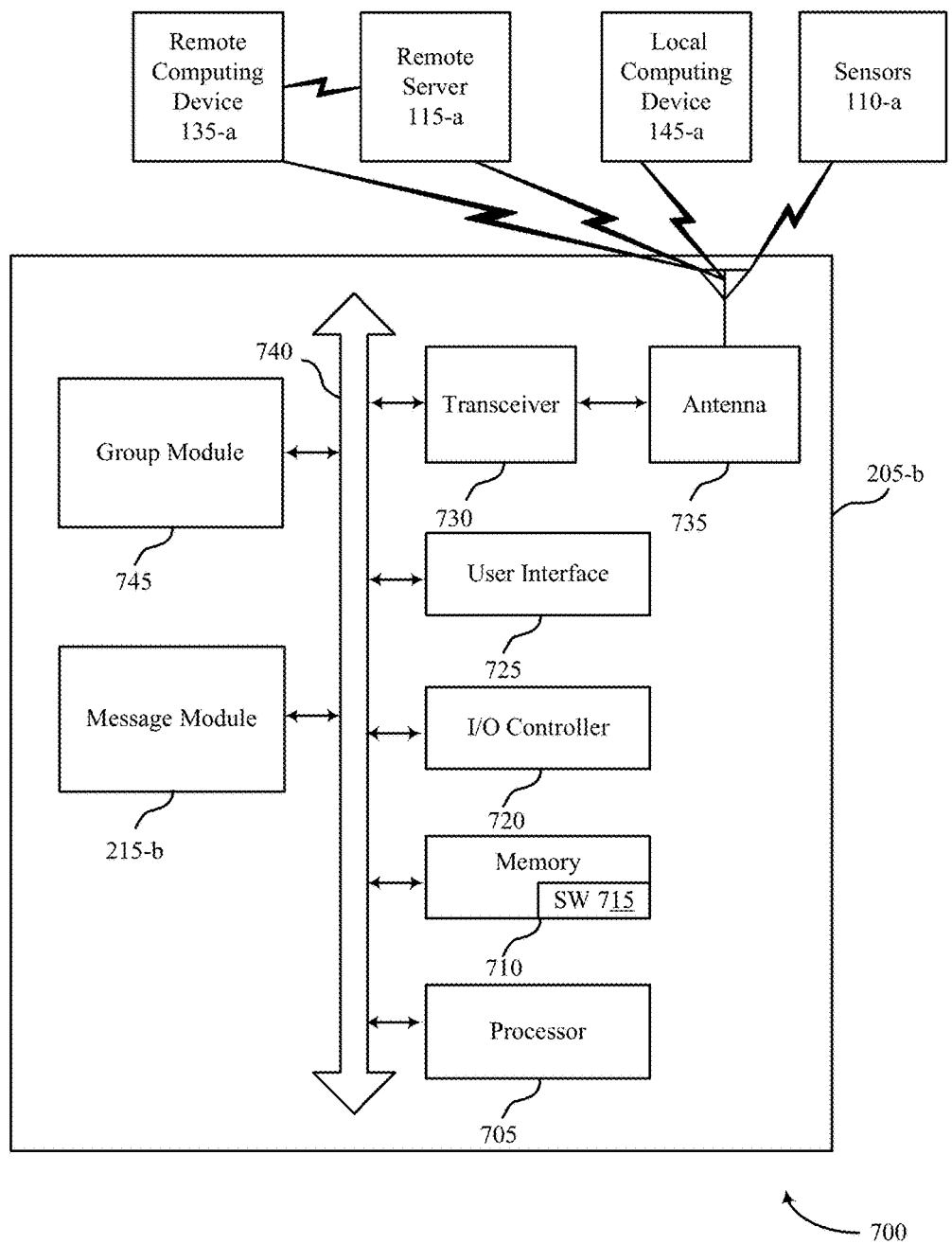
FIG. 7 shows an example computer system relating to a security and/or automation system, in accordance with various aspects of this disclosure.

FIG. 7 shows a system 700 for use in event triggered messaging in accordance at least some embodiments. System 700 may include an apparatus 205-*b*, which may be an example of the control panel 130, remote computing device 135, local computing device 145, and/or one or more sensors 110 of FIG. 1. Apparatus 205-*b* may also be an example of one or more aspects of apparatus 205 and/or 205-*a* and/or 205-*b* of FIGS. 2-6.

Apparatus 205-*b* may include a message module 215-*b*, which may be an example of the message module 215 and/or 215-*a* described with reference to FIGS. 2 and 3. The message module 215-*b* may enable capture of and broadcast of audio and/or video messages based at least in part on the identification and location of at least one person associated with the message, as described above with reference to FIGS. 2-6.

Apparatus 205-*b* may also include components for bi-directional voice and data communications including components for transmitting communications and components for receiving communications. For example, apparatus 205-*b* may communicate bi-directionally with remote computing device 135-*a*, remote server 115-*a*, or sensors 110-*a*. This bi-directional communication may be direct (e.g., apparatus 205-*b* communicating directly with sensor 110-*a*) or indirect (e.g., apparatus 205-*b* communicating with remote computing device 135-*a* via remote server 115-*a*). Remote server 115-*a*, remote computing device 135-*a*, local computing device 145-*a* and sensors 110-*a* may be examples of remote server 115, remote computing device 135, local computing device 145, and sensor 110 as shown with respect to FIG. 1.

In addition, apparatus 205-*b* may comprise group module 745, which may be a sub-module of message module 215-*b* or may be a separate and distinct module. In one embodiment, group module 745 may be enabled to receive information about a group of users which are authorized to leave and/or intended to be the recipients of at least one message. In one embodiment, messages may be specifically intended for a single recipient (e.g., the son). However, in other embodiments, messages may be intended for any of a group of intended recipients. For example, a mother may want to leave a message for either or both of her children to inform the children to take the dog on a walk when at least one of the two children arrives home from school. Thus, the group module 745 may know that one group of intended recipients may be "the Children," and includes both the son and the daughter. Thus, the group module may determine or otherwise receive information related to determining the presence, identification, and location of one or both of the children. Thus, if the son and/or daughter is identified and determined to be in a location to receive the message, the group module 745 may communicate with the message module 215-*b* to broadcast the intended message to at least one of the members of the intended group.

In some embodiments, a message may be a message that is recorded once, but is broadcast more than once on the occurrence of an event or other identifying element. For example, a pet owner may leave a dog in an area in the kitchen and may record a message to play for the dog at 3:00 p.m. which says "We'll be home soon, Rover!" The sound of the owner's voice may indicate to the dog that his owner will be returning soon and may comfort the dog. In some embodiments, a message may be recorded for encouragement purposes when the system recognizes an event has occurred. For example, the system may recognize when the child locks the back door, turns off the lights, or takes out the garage, the pre-recorded message may broadcast: "Good job! Thank you for taking out the garbage!" The pre-recorded message may be stored in memory (e.g., local, remote, cloud, etc.) and be re-broadcast each time the associated event occurs.

Apparatus 205-b may also include a processor 705, and memory 710 (including software (SW) 715), an input/output controller 720, a user interface 725, a transceiver 730, and one or more antennas 735, each of which may communicate—directly or indirectly—with one another (e.g., via one or more buses 740). The transceiver 730 may communicate bi-directionally—via the one or more antennas 735, wired links, and/or wireless links—with one or more networks or remote devices as described above. For example, the transceiver 730 may communicate bi-directionally with one or more of remote server 115-a or sensor 110-a. The transceiver 730 may include a modem to modulate the packets and provide the modulated packets to the one or more antennas 735 for transmission, and to demodulate packets received from the one or more antennas 735. While an apparatus comprising a sensor, local computing device, or control panel (e.g., 205-b) may include a single antenna 735, the apparatus may also have multiple antennas 735 capable of concurrently transmitting or receiving multiple wired and/or wireless transmissions. In some embodiments, one element of apparatus 205-b (e.g., one or more antennas 735, transceiver 730, etc.) may provide a direct connection to a remote server 115-a via a direct network link to the Internet via a POP (point of presence). In some embodiments, one element of apparatus 205-b (e.g., one or more antennas 735, transceiver 730, etc.) may provide a connection using wireless techniques, including digital cellular telephone connection, Cellular Digital Packet Data (CDPD) connection, digital satellite data connection, and/or another connection.

The signals associated with system 700 may include wireless communication signals such as radio frequency, electromagnetics, local area network (LAN), wide area network (WAN), virtual private network (VPN), wireless network (using 802.11, for example), 345 MHz, Z Wave, cellular network (using 3G and/or LTE, for example), and/or other signals. The one or more antennas 735 and/or transceiver 730 may include or be related to, but are not limited to, WWAN (GSM, CDMA, and WCDMA), WLAN (including Bluetooth and Wi-Fi), WMAN (WiMAX), antennas for mobile communications, antennas for Wireless Personal Area Network (WPAN) applications (including RFID and UWB). In some embodiments each antenna 735 may receive signals or information specific and/or exclusive to itself. In other embodiments each antenna 735 may receive signals or information neither specific nor exclusive to itself.

In some embodiments, the user interface 725 may include an audio device, such as an external speaker system, a visual device such as a camera or video camera, an external display device such as a display screen, and/or an input device (e.g., remote control device interfaced with the user interface 735 directly and/or through I/O controller 720).

One or more buses 7840 may allow data communication between one or more elements of apparatus 205-b (e.g., processor 705, memory 710, I/O controller 720, user interface 725, etc.).

The memory 710 may include random access memory (RAM), read only memory (ROM), flash RAM, and/or other types. The memory 710 may store computer-readable, computer-executable software/firmware code 715 including instructions that, when executed, cause the processor 705 to perform various functions described in this disclosure (e.g., detect identification and/or location data, broadcast audio communications from the remote computing device, etc.). Alternatively, the computer-executable software/firmware code 715 may not be directly executable by the processor 705 but may cause a computer (e.g., when compiled and executed) to perform functions described herein.

In some embodiments the processor 705 may include, among other things, an intelligent hardware device (e.g., a central processing unit (CPU), a microcontroller, and/or an ASIC, etc.). The memory 710 may contain, among other things, the Basic Input-Output system (BIOS) which may control basic hardware and/or software operation such as the interaction with peripheral components or devices. For example, the message module 215-b may be stored within the system memory 710. Applications resident with system 700 are generally stored on and accessed via a non-transitory computer readable medium, such as a hard disk drive or other storage medium. Additionally, applications may be in the form of electronic signals modulated in accordance with the application and data communication technology when accessed via a network interface (e.g., transceiver 730, one or more antennas 735, etc.).

Many other devices and/or subsystems may be connected to, or may be included as, one or more elements of system 700 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 7 need not be present to practice the present systems and methods. The devices and subsystems can be interconnected in different ways from that shown in FIG. 7. In some embodiments, an aspect of some operation of a system, such as that shown in FIG. 7, may be readily known in the art and is not discussed in detail in this disclosure. Code to implement the present disclosure may be stored in a non-transitory computer-readable medium such as one or more of system memory 710 or other memory. The operating system provided on I/O controller 720 may be iOS®, ANDROID®, MS-dOS®, MS-WINDOWS®, OS/2®, UNIX®, LINUX®, or another known operating system.

The components of the apparatus 205-b may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

Figure 8:
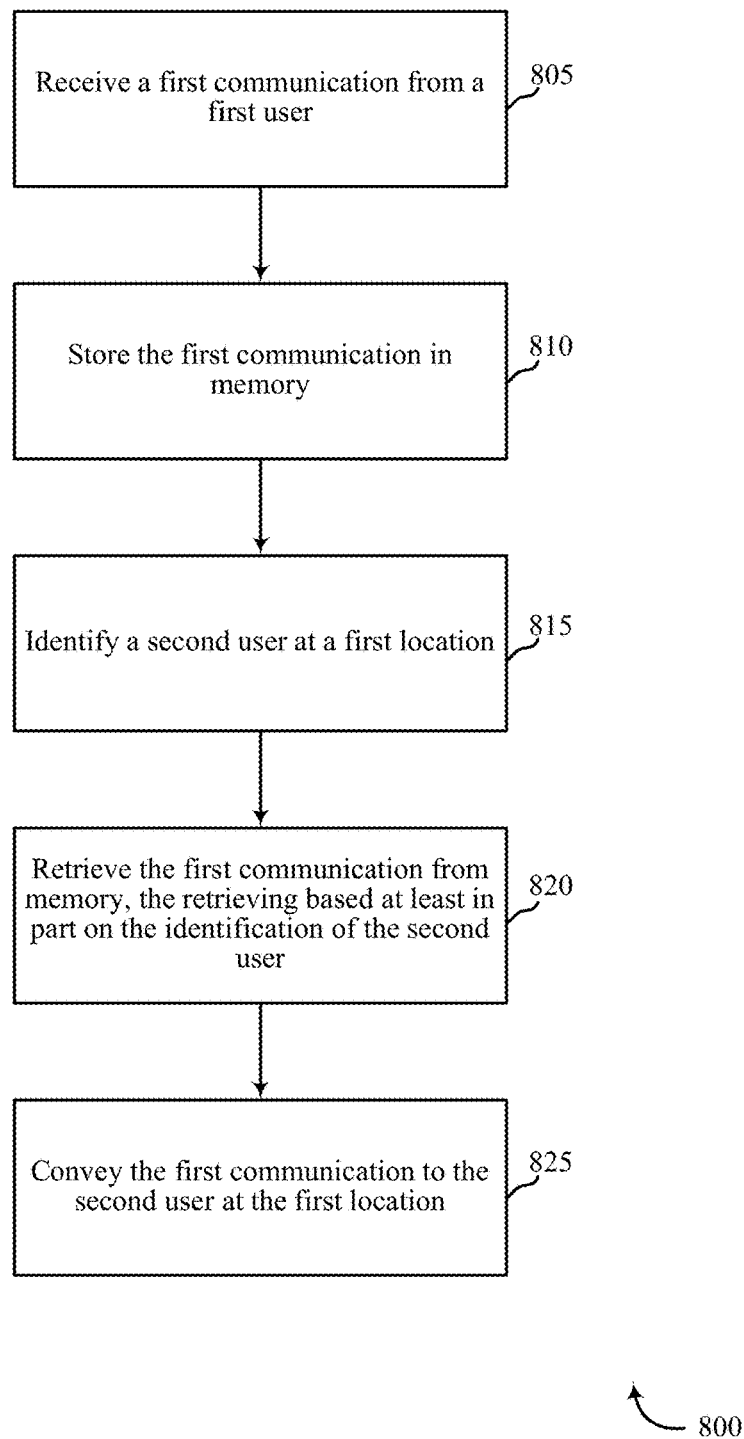
FIG. 8 is a flow chart illustrating an example of a method relating to a security and/or an automation system, in accordance with various aspects of this disclosure.

FIG. 8 is a flow chart illustrating an example of a method 800 for event triggered messaging, in accordance with at least some embodiments. For clarity, the method 800 is described below with reference to aspects of one or more of the sensors 110, local computing device 145, control panel 130, and/or remote computing device 135 as described with reference to at least FIG. 1. In addition, method 800 is described below with reference to aspects of one or more of the apparatus 205, 205-*a*, or 205-*b* described with reference to at least FIGS. 2-7. In some examples, a control panel, local computing device, and/or sensor may execute one or more sets of codes to control the functional elements described below. Additionally or alternatively, the control panel, local computing device, and/or sensor may perform one or more of the functions described below using special-purpose hardware.

At block 805, the method 800 may include receiving a first communication from a first user. For example, remote computing device 135 may transmit an audio and/or video message to one or more local computing devices 145 located in one or more specific rooms of a house (e.g., the kitchen). In other embodiments, the remote computing device 135 may transmit a message to a control panel 130 located in a specific room of the house. In still other embodiments, the control panel 130 and/or local computing device 145 may receive a message directly from a user. For example, a father may interact with the control panel 130 directly to record a message for another household member to receive at a later time in the same location and/or in another location. The interaction with the control panel may include various input methods (e.g., a voice command, tactile input, etc.) to record a message.

At block 810, the method 800 may include storing the first communication in memory. The first communication may be an audio and/or video message. The message may be stored on the remote computing device 135, the local computing device 145, the control panel 130, server 115, and/or on a remote cloud server.

At block 815, the method 800 may include identifying a second user at a first location. For example, identifying a second user may include identification by way of biometric identification (e.g., voice matching, facial scan, retinal and/or iris scanning, determination and analysis of features such as hair length, hair color, height, weight, gait, identifying marks such as birthmarks and/or tattoos), by way of a user-provided input (e.g., a personal identification number (PIN) entry, a password, etc.), by way of recognizing an electronic communication from a device associated with the person (e.g., signals received from a portable electronic device or sub-dermal electronic device), some combination, and/or other data, input, and/or information.

At block 820, the method 800 may include retrieving the first communication from memory, the retrieving based at least in part on the identification of the second user. For example, once the system identifies a person located in a specific location, the system may determine the previously stored message is intended for the identified person. In some cases, as previously discussed, a person may be identified, but the message is not intended for the identified person and/or the person is not determined to be in the location where the message is intended to be broadcast. However, if the person is identified to be the intended recipient, the system may retrieve the stored message from memory and broadcast and/or display it in one form or another.

At block 825, the method 800 may include conveying the first communication to the second user at the first location. The system, after retrieving the message from memory, may broadcast the message to the intended recipient. In some embodiments, the message may be conveyed or broadcast as an audio broadcast. In other embodiments, the message may be a video message and/or a video message with or without audio components. In yet other embodiments, the message may be a holographic message or other projected image (i.e., 2-dimensional audio and/or video message or a 3-dimensional audio and/or video message).

The operations at blocks 805, 810, 815, 820, and 825 may be performed using the receiver module 210 and/or 210-*a*, the message module 215, 215-*a*, and/or 215-*b*, the transmitter module 220 and/or 220-*a*, and/or the transceiver 730, described with reference to FIGS. 2-7.

Thus, the method 800 may enable event triggered messaging in accordance with at least some embodiments. It should be noted that the method 800 is just one implementation and that the operations of the method 800 may be rearranged or otherwise modified such that other implementations are possible.

Figure 9:
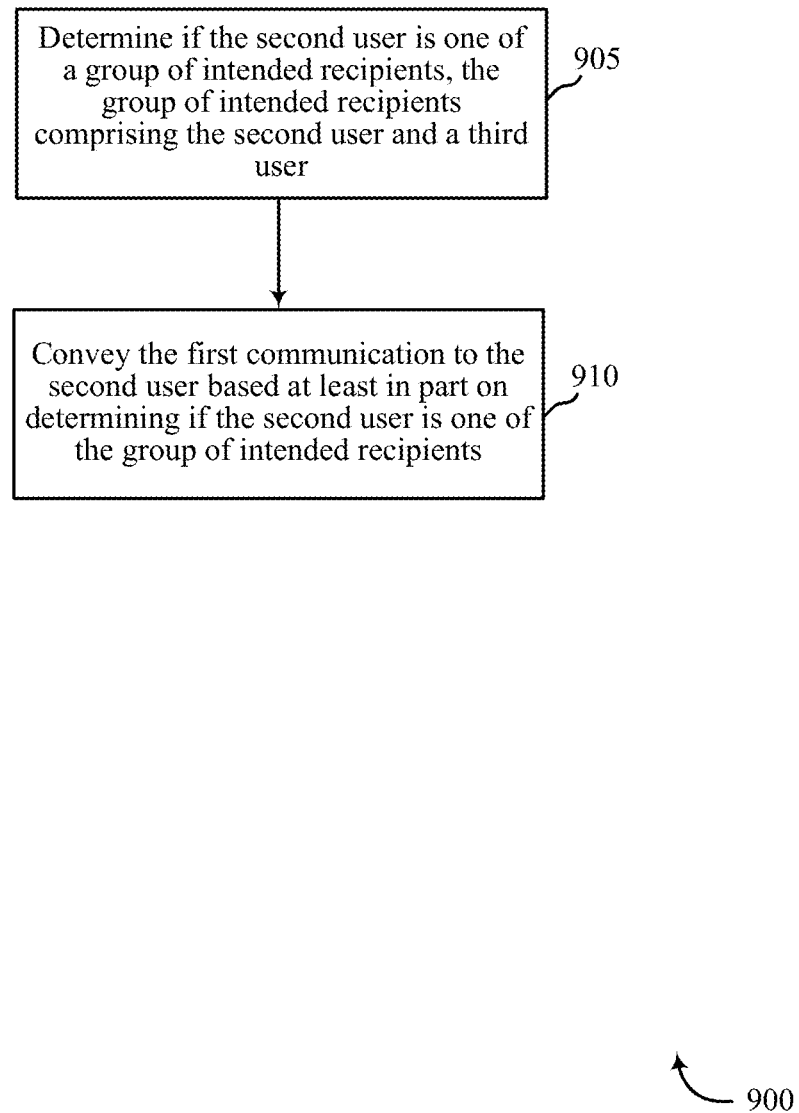
FIG. 9 is a flow chart illustrating an example of a method relating to a security and/or an automation system, in accordance with various aspects of this disclosure.

FIG. 9 is a flowchart illustrating an example of a method 900 for event triggered messaging in accordance with at least some embodiments. For clarity, the method 900 is described below with reference to aspects of one or more of the sensors 110, remote computing device 135, local computing device 145, and/or control panel 130, and/or aspects of one or more of the apparatus 205, 205-*a*, or 205-*b* described with reference to FIGS. 1-8. In some examples, a control panel, local computing device, and/or sensor may execute one or more sets of codes to control the functional elements described below. Additionally or alternatively, the control panel, local computing device, and/or sensor may perform one or more of the functions described below using special-purpose hardware.

At block 905, method 900 may include determining if the second user is one of a group of intended recipients, where the group of intended recipients comprises the second user and a third user. For example, a group of intended users may include the son and the daughter living in a home. If a message is intended to be received by any one of the members of the group of intended users, then the method may determine that the son and/or daughter is present and/or may receive the message.

At block 910, method 900 may include conveying the first communication to the second user based at least in part on determining if the second user is one of the group of intended recipients. For example, if the message is intended to be delivered to either the son or the daughter (or in some cases both the son and daughter), then the message will be delivered if the system determines the son, the daughter, and/or the son and daughter are present at the correct location.

The operations at blocks 905 and 910 may be performed using the receiver module 210 and/or 210-*a*, the message module 215, 215-*a*, and/or 215-*b*, the transmitter module 220 and/or 220-*a*, and/or the transceiver 730, described with reference to FIGS. 2-7.

Thus, the method 900 may enable event triggered messaging in accordance with at least some embodiments. It should be noted that the method 900 is just one implementation and that the operations of the method 900 may be rearranged or otherwise modified such that other implementations are possible.

Figure 10:
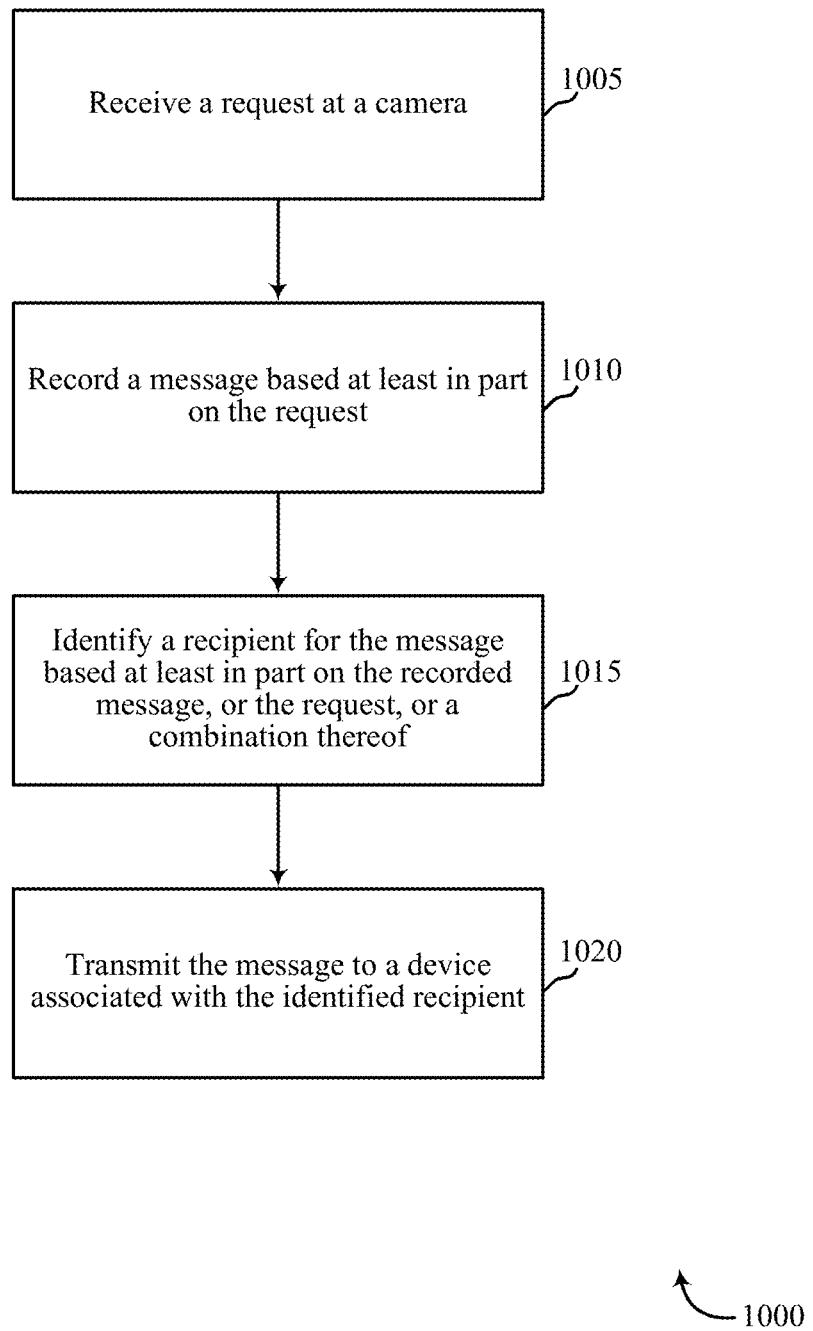
FIG. 10 is a flow chart illustrating an example of a method relating to a security and/or an automation system, in accordance with various aspects of this disclosure.

FIG. 10 is a flow chart illustrating an example of a method 1000 for event triggered messaging, in accordance with at least some embodiments. For clarity, the method 1000 is described below with reference to aspects of one or more of the sensors 110, local computing device 145, control panel 130, and/or remote computing device 135 as described with reference to at least FIG. 1. In addition, method 1000 is described below with reference to aspects of one or more of the apparatus 205, 205-*a*, or 205-*b* described with reference to at least FIGS. 2-7. In some examples, a control panel, local computing device, and/or sensor may execute one or more sets of codes to control the functional elements described below. Additionally or alternatively, the control panel, local computing device, and/or sensor may perform one or more of the functions described below using special-purpose hardware.

At block 1005, the method 1000 may include receiving a request at a camera. In some embodiments, a camera (e.g., computing device 135 or 145, control panel 130,) may receive a request from a user requesting to establish a connection with another user (or an associated device) to leave a message for the other person. In some embodiments, the request may indicate that the user may want to leave a quick video/voice message to other people within the home without requiring a live interaction. In other embodiments, the request may be associated with an outgoing communication outside the home. In some embodiments, a user may input a request at a control panel that may be coupled to a camera for leaving a message. In some embodiments, a user may input a request at a camera device enabling communication with another device. The input at the control panel or the camera itself may include, but is not limited to, a voice command, tactile input, etc. The operation at block 1005 may be performed using the receiver module 210, computing device 135, control panel 130, sensors 110, or apparatus 205, described with reference to FIGS. 2-7.

At block 1010, the method 1000 may include recording a message based at least in part on the request. The operation at block 1010 may be performed using the receiver module 210, recordation module 305, computing device 135, control panel 130, sensors 110, or apparatus 205, described with reference to FIGS. 2-7.

At block 1015, the method 1000 may include identifying a recipient for the message based at least in part on the recorded message, or the request, or a combination thereof. In one embodiment, identifying a recipient for the message may be based at least in part on an identification of related information (e.g., phone number, name of the person) associated with an outgoing call. In one embodiment, a recipient for the message may be identified based at least in part on pre-programmed contacts in memory associated with the camera, a home automation system, a user-defined contact list, a trusted person list, or other information. The operation at block 1015 may be performed using the receiver module 210, identification module 310, computing device 135, control panel 130, sensors 110, or apparatus 205, described with reference to FIGS. 2-7.

At block 1020, the method 1000 may include transmitting the message to a device associated with the identified recipient. In some embodiments, the message may be conveyed or broadcast as an audio broadcast. In other embodiments, the message may be a video message with or without an audio component. In some embodiments, the camera may broadcast the message to one or more messaging interfaces (e.g., email, SMS, voicemail, etc.) associated with the intended recipient of the message (e.g., child's mother). For example, the camera may receive location information from another device that indicates a location of the recipient or may determine a location of the recipient and send the message based on this location (e.g., the mother is located in her office). The message may be sent to the mother when she is located in her office or a car (e.g., to a mobile device associated with the mother) or to the mother's office or car computer, phone, pager, email, and/or other communication device associated with the mother's office or car, among other locations.

In some embodiments, the camera may broadcast a message based at least in part on pre-stored schedule data associated with the mother and accessible by or known by the automation system. For instance, the camera may broadcast the message to the mother's office based at least in part on the pre-stored schedule data associated with the mother, which may indicate that mother is in predicted to be in her office between the hours of 8:00 am to 6:00 pm. Alternatively, the camera may broadcast a message based at least in part on pre-stored schedule data for a particular day and time associated with the mother and accessible by or known by the automation system. For instance, the camera may broadcast the message to the mother's car based at least in part on the pre-stored schedule data associated with the mother, which may indicate that mother is traveling to a meeting or another appointment between 3:00 pm and 4:00 pm, even though the mother would otherwise be predicted to be in her office between the hours of 8:00 am to 6:00 pm. The operation at block 1020 may be performed using the broadcast module 325, the transmitter module 220, computing device 135, control panel 130, sensors 110, or apparatus 205, described with reference to FIGS. 2-7.

The operations at blocks 1005, 1010, 1015, and 1020 may be performed using the receiver module 210 and/or 210-*a*, the message module 215, 215-*a*, and/or 215-*b*, the transmitter module 220 and/or 220-*a*, and/or the transceiver 730, described with reference to FIGS. 2-7.

Thus, the method 1000 may enable event triggered messaging in accordance with at least some embodiments. It should be noted that the method 1000 is just one implementation and that the operations of the method 1000 may be rearranged or otherwise modified such that other implementations are possible.

Figure 11:
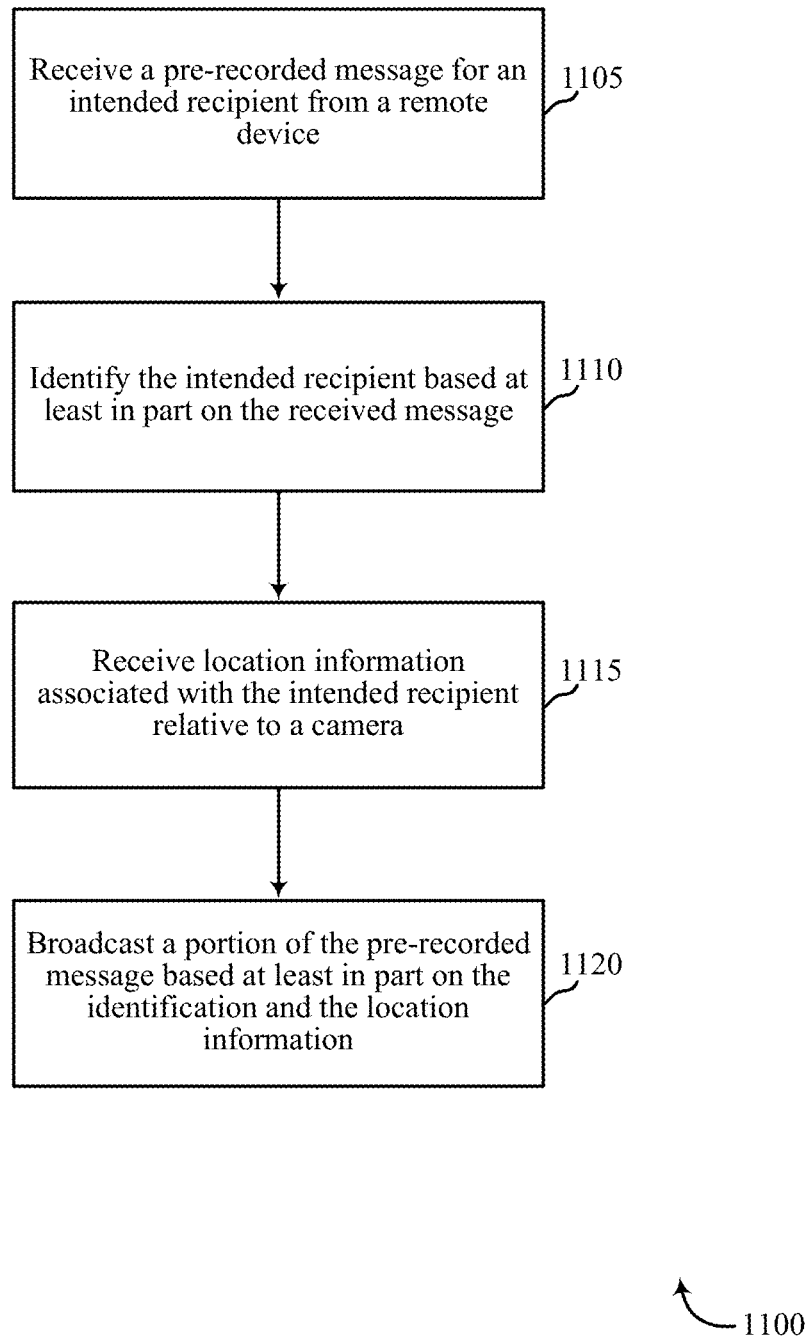
FIG. 11 is a flow chart illustrating an example of a method relating to a security and/or an automation system, in accordance with various aspects of this disclosure.

FIG. 11 is a flow chart illustrating an example of a method 1100 for event triggered messaging, in accordance with at least some embodiments. For clarity, the method 1100 is described below with reference to aspects of one or more of the sensors 110, local computing device 145, control panel 130, and/or remote computing device 135 as described with reference to at least FIG. 1. In addition, method 1100 is described below with reference to aspects of one or more of the apparatus 205, 205-*a*, or 205-*b* described with reference to at least FIGS. 2-7. In some examples, a control panel, local computing device, and/or sensor may execute one or more sets of codes to control the functional elements described below. Additionally or alternatively, the control panel, local computing device, and/or sensor may perform one or more of the functions described below using special-purpose hardware.

At block 1105, the method 1100 may include receiving a pre-recorded message for an intended recipient from a remote device. In some embodiments, a person at a remote location (e.g., outside the home) may want to record and broadcast a message to a person within a home using a camera. For instance, a parent may record an audio and/or visual message on his/her remote device and may broadcast the message from his/her remote device to the camera. The operation at block 1105 may be performed using the receiver module 210, computing device 135, control panel 130, sensors 110, or apparatus 205, described with reference to FIGS. 2-7.

At block 1110, the method 1100 may include identifying the intended recipient based at least in part on the received message. In one embodiment, identifying a recipient for the pre-recorded message may be based at least in part on an identification of related information (e.g., phone number, name of the person) associated with an outgoing call. In one embodiment, a recipient for the message may be identified based at least in part on pre-programmed contacts in memory associated with the camera. In other embodiments, the camera may identify a recipient of the message and the location of the recipient based on artificial intelligence or context clues. The operation at block 1110 may be performed using the receiver module 210, recordation module 305, computing device 135, control panel 130, sensors 110, or apparatus 205, described with reference to FIGS. 2-7.

At block 1115, the method 1100 may include receiving location information associated with the intended recipient relative to a camera. In some embodiments, the location information may be received from a remote device associated with the intended recipient. For example, the camera may receive from a remote device associated with the intended recipient a schedule. In some embodiments, the camera may communicate with one or more components of the home automation system and receive a pre-stored schedule data associated with the intended recipient that is known by the automation system. The operation at block 1115 may be performed using the receiver module 210, identification module 310, computing device 135, control panel 130, sensors 110, or apparatus 205, described with reference to FIGS. 2-7.

At block 1120, the method 1100 may include broadcasting a portion of the pre-recorded message based at least in part on the identification and/or the location information. In some embodiments, the message may be conveyed or broadcast as an audio broadcast, even if the message as originally recorded included audio and video. This may enable a camera to play the message (using limited data types, such as audio only) even if the camera does not support or is not enabled to play another data type (e.g., video). In other embodiments, the message may be a video message with or without audio components. In some embodiments, a location of the recipient may be determined using one or more home automation sensors, GPS, and/or other methods and the camera may broadcast the message based on this location. The message may be broadcast to a device determined at or within a predetermined distance as the recipient's location. For example, a device may be determined as mobile or stationary and a location of a device may be identified. The device may receive the message based on an actual or a predicted location of a user, including the location of the user relative to the device.

In further embodiments, the camera may broadcast a message based at least in part on pre-stored schedule data associated with the mother known by the automation system. For instance, the camera may broadcast the message to the mother's office based at least in part on the pre-stored schedule data associated with the mother, that may indicate that mother is in her office between the hours of 8:00 am to 6:00 pm. The operation at block 1120 may be performed using the broadcast module 325, the transmitter module 220, computing device 135, control panel 130, sensors 110, or apparatus 205, described with reference to FIGS. 2-7.

The operations at blocks 1105, 1110, 1115, and 1120 may be performed using the receiver module 210 and/or 210-a, the message module 215, 215-a, and/or 215-b, the transmitter module 220 and/or 220-a, and/or the transceiver 730, described with reference to FIGS. 2-7.

Thus, the method 1000 may enable event triggered messaging in accordance with at least some embodiments. It should be noted that the method 1000 is just one implementation and that the operations of the method 1000 may be rearranged or otherwise modified such that other implementations are possible.

In some examples, aspects from two or more of the methods 800, 900, 1000, and 1100 may be combined and/or separated. It should be noted that the methods 800, 900, 1000, and 1100 are just example implementations, and that the operations of the methods 800, 900, 1000, and 1100 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. This disclosure may specifically apply to communication system application. In some embodiments, the concepts, the technical descriptions, the features, the methods, the ideas, and/or the descriptions may specifically apply to security and/or automation and/or communication system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for wireless communication, comprising:
   receiving, via a transceiver of a camera, an electronic message at a first location;
   determining, via the camera, that the electronic message comprises an audio portion;
   analyzing, via the camera, the audio portion of the electronic message to determine a sender of the electronic message and information associated with an intended recipient of the electronic message;
   comparing, via the camera, the determined information with information stored in memory associated with the camera;
   identifying, via the camera, the intended recipient of the electronic message based at least in part on the comparing and the determined sender; and
   broadcasting a portion of the electronic message based at least in part on identifying the intended recipient.

2. The method of claim 1, further comprising:
   receiving, via the transceiver of the camera, location information associated with the intended recipient relative to the camera;
   determining a location of the intended recipient based at least in part on the received location information; and
   broadcasting the portion of the electronic message based at least in part on the received location information, the determined location of the intended recipient, or both.

3. The method of claim 2, wherein the location information is received from a remote device associated with the intended recipient, the remote device being located at a remote location relative to the camera.

4. The method of claim 2, further comprising:
receiving, via the transceiver of the camera, a pre-stored schedule data from a remote device associated with the intended recipient; and
determining the location of the intended recipient based at least in part on the received schedule data, wherein broadcasting the portion of the electronic message is based at least in part on the received schedule data and the location of the intended recipient.

5. The method of claim 2, wherein the location of the intended recipient is determined based at least in part on at least one of one or more home automation sensors, a global positioning system (GPS), context clues associated with the electronic message, or a combination thereof.

6. The method of claim 2, further comprises:
determining that a remote device is located at or within a predetermined distance of the determined location of the intended recipient; and
broadcasting the portion of the electronic message to the remote device at or within the predetermined distance.

7. The method of claim 1, further comprising:
retrieving the information stored in the memory associated with the camera.

8. The method of claim 7, wherein the information stored in the memory associated with the camera is at least one of a pre-programmed contact, a telephone number associated with an outgoing call, a name associated with the outgoing call, or a combination thereof.

9. The method of claim 1, wherein the broadcasting comprises an audio broadcast, a video broadcast, or both.

10. The method of claim 1, wherein the electronic message is received from a second location remote from the first location.

11. The method of claim 1, wherein the electronic message comprises a pre-recorded message.

12. An apparatus for wireless communication, comprising:
a processor;
memory in electronic communication with the processor; and
instructions stored in the memory, the instructions causing the processor to::
receive, via a transceiver of a camera, an electronic message at a first location;
determine, via the camera, that the electronic message comprises an audio portion;
analyze, via the camera, the audio portion of the electronic message to determine a sender of the electronic message and information associated with an intended recipient of the electronic message;
compare, via the camera, the determined information with information stored in memory associated with the camera;
identify, via the camera, the intended recipient of the electronic message based at least in part on the comparing and the determined sender; and
broadcast a portion of the electronic message based at least in part on identifying the intended recipient.

13. The apparatus of claim 12, wherein the instructions further cause the processor to:
receive location information associated with the intended recipient relative to the camera;
determine a location of the intended recipient based at least in part on the received location information; and
broadcast the portion of the electronic message based at least in part on the received location information, the determined location of the intended recipient, or both.

14. The apparatus of claim 13, wherein the location information is received from a remote device associated with the intended recipient, the remote device being located at a remote location relative to the camera.

15. The apparatus of claim 13, wherein the instructions further cause the processor to:
receive a pre-stored schedule data from a remote device associated with the intended recipient; and
determine the location of the intended recipient based at least in part on the received schedule data, wherein broadcasting the portion of the electronic message is based at least in part on the received schedule data and the location of the intended recipient.

16. The apparatus of claim 13, wherein the location of the intended recipient is determined based at least in part on at least one of one or more home automation sensors, a global positioning system (GPS), context clues associated with the electronic message, or a combination thereof.

17. The apparatus of claim 13, wherein the instructions further cause the processor to:
determine that a remote device is located at or within a predetermined distance of the determined location of the intended recipient; and
broadcast the portion of the electronic message to the remote device at or within the predetermined distance.

18. A non-transitory computer-readable medium storing computer-executable code, the code executable by a processor to:
receive, via a transceiver of a camera, an electronic message at a first location;
determine, via the camera, that the electronic message comprises an audio portion;
analyze, via the camera, the audio portion of the electronic message to determine a sender of the electronic message and information associated with an intended recipient of the electronic message;
compare, via the camera, the determined information with information stored in memory associated with the camera;
identify, via the camera, the intended recipient of the electronic message based at least in part on the comparing and the determined sender; and
broadcast a portion of the electronic message based at least in part on identifying the intended recipient.

19. The non-transitory computer-readable medium of claim 18, wherein the code further executable by the processor to:
receive location information associated with the intended recipient relative to the camera;
determine a location of the intended recipient based at least in part on the received location information; and
broadcast the portion of the electronic message based at least in part on the received location information, the determined location of the intended recipient, or both.

20. The non-transitory computer-readable medium of claim 19, wherein the location information is received from a remote device associated with the intended recipient, the remote device being located at a remote location relative to the camera.

* * * * *